United States Patent
Chen et al.

(10) Patent No.: US 10,692,194 B2
(45) Date of Patent: Jun. 23, 2020

(54) METHOD AND TERMINAL FOR DISPLAYING EDGE OF RECTANGULAR FRAME

(71) Applicant: HUAWEI TECHNOLOGIES CO., LTD., Shenzhen (CN)

(72) Inventors: Xin Chen, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/338,472

(22) PCT Filed: Sep. 30, 2016

(86) PCT No.: PCT/CN2016/101414
§ 371 (c)(1),
(2) Date: Mar. 30, 2019

(87) PCT Pub. No.: WO2018/058690
PCT Pub. Date: Apr. 5, 2018

(65) Prior Publication Data
US 2020/0043147 A1    Feb. 6, 2020

(51) Int. Cl.
*G06T 5/00* (2006.01)
*H04N 5/232* (2006.01)

(52) U.S. Cl.
CPC ......... *G06T 5/008* (2013.01); *H04N 5/23293* (2013.01); *G06T 2207/10024* (2013.01);
(Continued)

(58) Field of Classification Search
CPC . G06T 2207/10024; G06T 2207/20192; G06T 2207/20208; G06T 5/00; G06T 5/008; H04N 5/23293
See application file for complete search history.

(56) References Cited

U.S. PATENT DOCUMENTS

| 2008/0144962 A1 | 6/2008 | Jung et al. |
| 2011/0109620 A1 | 5/2011 | Hong et al. |

(Continued)

FOREIGN PATENT DOCUMENTS

| CN | 102769758 A | 11/2012 |
| CN | 103544004 A | 1/2014 |

(Continued)

OTHER PUBLICATIONS

Huang Yuqing et al., "Haze removal method for UAV reconnaissance images based on image enhancement", Journal of Beijing University of Aeronautics and Astronsutics, dated Mar. 2007, total 31 pages with 21 pages English translation.

(Continued)

*Primary Examiner* — Amy R Hsu
(74) *Attorney, Agent, or Firm* — Kilpatrick Townsend & Stockton LLP

(57) ABSTRACT

A method includes: separately creating a rectangular area $R_1$ and a rectangular area $R_2$ by using the first line segment as one side; determining a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$; converting the vector $V_1$ to a vector $a_1=(h_1,s_1,b_1)$ of an HSB color space, and converting the vector $V_2$ to a vector $a_2=(h_2,s_2,b_2)$ of the HSB color space; determining a vector $a_0=(h_0,s_0,b_0)$ of the first line segment in the HSB color space based on the vector $a_1$ and the vector $a_2$; and converting the vector $a_0$ to a vector $V_0=(V_{0r},V_{0g},V_{0b})$ in the RGB color space; and after each edge line segment in the target quadrilateral is processed, displaying the target quadrilateral based on a vector of each edge line segment in the target quadrilateral in the RGB color space.

20 Claims, 8 Drawing Sheets

(52) U.S. Cl.
CPC .............. *G06T 2207/20192* (2013.01); *G06T 2207/20208* (2013.01)

(56) References Cited

U.S. PATENT DOCUMENTS

| | | | | |
|---|---|---|---|---|
| 2015/0138227 A1* | 5/2015 | Zhao | ........................ | H04N 5/57 345/601 |
| 2015/0213326 A1* | 7/2015 | Utsumi | ................ | G06K 9/6212 348/223.1 |
| 2015/0310592 A1* | 10/2015 | Kano | ........................ | H04N 1/58 382/167 |
| 2017/0032497 A1* | 2/2017 | Sarma | ........................ | G06T 3/40 |
| 2018/0204085 A1* | 7/2018 | Chennubhotla | ...... | G06K 9/4652 |

FOREIGN PATENT DOCUMENTS

| | | | |
|---|---|---|---|
| CN | 104156921 A | 11/2014 | |
| CN | 104537615 A | 4/2015 | |
| CN | 105005461 A | 10/2015 | |
| CN | 105118029 A | 12/2015 | |
| CN | 105488793 A | 4/2016 | |
| KR | 20110052207 A | 5/2011 | |

OTHER PUBLICATIONS

Yu Hao et al.,"Ladle License Plate Recognition Based on Image Processing", Electronic Sei.and Tech / Jan. 15, 2016, total 5 pages.
Yi Wan et al.,"Joint image dehazing and contrast enhancement using the Hsv color space", 2015 Visual Communications and Image Processing (VCIP), total 4 pages.

* cited by examiner

METHOD AND TERMINAL FOR DISPLAYING EDGE OF RECTANGULAR FRAME

CROSS-REFERENCE TO RELATED APPLICATIONS

This application is a National Stage of International Application No. PCT/CN2016/101414, filed on Sep. 30, 2016, which is hereby incorporated by reference in its entirety.

TECHNICAL FIELD

The present invention relates to the field of image processing technologies, and in particular, to a method and a terminal for displaying an edge of a rectangular frame.

BACKGROUND

With continuous development of the science and technology, a growing quantity of devices with cameras are applied to daily lives. However, because a photo captured by a camera is an image obtained by means of projection transformation, an image with a distorted rectangular frame that is captured by the camera needs to be corrected, so that the rectangular frame is still rectangular in the image, and a length-width ratio remains the same as a length-width ratio of a rectangular frame in the real world.

At present, before an image with a rectangular frame is corrected, a fixed color that is set by an application is used to draw a detected border of a quadrilateral. However, because the color is relatively undiversified, and colors of areas at two sides of the border are relatively diversified, in some scenarios, a border color and the colors of the areas at the two sides of the border may all be warm colors or cool colors. Consequently, contrast between the border color and the colors of the areas at the two sides of the border is low. As shown in FIG. 1, it is assumed that a border of an upper edge of a quadrilateral is white (that is, a fixed color that is set by a device is white), and colors of areas at two sides of the border are respectively red and yellow. Because red and yellow are of relatively high brightness and both are "warm" colors, contrast between the color of the upper edge of the quadrilateral and the colors of the surroundings is low.

Therefore, a problem that contrast between a border color and colors of areas at two sides of a border is low is an urgent problem to be resolved at present.

SUMMARY

Embodiments of the present invention provide a method and a terminal for displaying an edge of a rectangular frame, so as to resolve at least a prior-art problem that contrast between a border color and colors of areas at two sides of a border is low.

To achieve the foregoing objective, the following technical solutions are used in the embodiments of the present invention.

According to an aspect, an embodiment of the present invention provides a method for displaying an edge of a rectangular frame. The method includes: obtaining, by a terminal, a red green blue RGB image of a captured target rectangle; detecting, by the terminal, an edge of the RGB image, to obtain a target quadrilateral corresponding to the target rectangle; processing, by the terminal, each edge line segment in the target quadrilateral based on the following operations on a first line segment: separately creating, by the terminal, a rectangular area $R_1$ and a rectangular area $R_2$ by using the first line segment as one side; determining, by the terminal, a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area converting, by the terminal, the vector $V_1$ to a vector $a_1=(h_1,s_1,b_1)$ of a hue saturation brightness HSB color space, and converting, by the terminal, the vector $V_2$ to a vector $a_2=(h_2,s_2,b_2)$ of the HSB color space; determining, by the terminal, a vector $a_0=(h_0,s_0,b_0)$ of the first line segment in the HSB color space based on the vector $a_1$ and the vector $a_2$; and converting, by the terminal, the vector $a_0$ to a vector $V_0=(V_{0r},V_{0g},V_{0b})$ of the RGB color space; and after the terminal processes each edge line segment in the target quadrilateral based on the foregoing operations on the first line segment, displaying, by the terminal, the target quadrilateral based on a vector of each edge line segment in the target quadrilateral in the RGB color space.

In this way, when the terminal performs a preview during photographing or corrects a rectangular image in a captured picture, if colors of areas at two sides of a border are both warm colors or cool colors, the terminal can adaptively determine a border color, and generate a border color having better contrast with the colors of the areas at the two sides of the border, thereby improving the contrast between the border color and the colors of the areas at the two sides of the border, and improving user experience.

In a possible design, the separately creating, by the terminal, a rectangular area $R_1$ and a rectangular area $R_2$ by using the first line segment as one side may specifically include: creating, by the terminal, the rectangular area $R_1$ and the rectangular area $R_2$ by using the first line segment as one side, and each of two line segments parallel to and having a same distance to the first line segment as another side.

In a possible design, the determining, by the terminal, a vector $a_0=(h_0,s_0,b_0)$ of the first line segment in the HSB color space based on the vector $a_1$ and the vector $a_2$ includes: determining, by the terminal, $h_0$ in the vector $a_0=(h_0,s_0,b_0)$ of the first line segment in the HSB color space based on $h_1$ and $h_2$; determining, by the terminal, $s_0$ in the vector $a_0=(h_0,s_0,b_0)$ of the first line segment in the HSB color space based on $s_1$ and $s_2$; and determining, by the terminal, $b_0$ in the vector $a_0=(h_0,s_0,b_0)$ of the first line segment in the HSB color space based on $b_1$ and $b_2$.

In a possible design, the determining, by the terminal, $h_0$ in the vector $a_0=(h_0,s_0,b_0)$ of the first line segment in the HSB color space based on $h_1$ and $h_2$ includes: determining, by the terminal, a complementary color of $h_1$ and a complementary color of $h_2$ based on $h_1$, $h_2$, and the following first preset formula; and determining, by the terminal, $h_0$ in the vector $a_0=(h_0,s_0,b_0)$ of the first line segment in the HSB color space based on the complementary color of $h_1$, the complementary color of $h_2$, and the following second preset formula, where the first preset formula includes:

$$\begin{cases} h_{1c} = h_1 + 180 \\ h_{2c} = h_2 + 180 \end{cases},$$

where $h_{1c}$ indicates the complementary color of $h_1$, and $h_{2c}$ indicates the complementary color of $h_2$; and the second preset formula includes:

$$h_0 = \begin{cases} \dfrac{h_{1c} + h_{2c}}{2} & \text{when } \dfrac{h_{1c} + h_{2c}}{2} < 360 \\ \dfrac{h_{1c} + h_{2c}}{2} - 360 & \text{when } \dfrac{h_{1c} + h_{2c}}{2} \geq 360 \end{cases}.$$

In a possible design, the determining, by the terminal, $s_0$ in the vector $a_0=(h_0,s_0,b_0)$ of the first line segment in the HSB color space based on $s_1$ and $s_2$ includes: determining, by the terminal, the larger one of $s_1$ and $s_2$ as $s_0$ in the vector $a_0=(h_0,s_0,b_0)$ of the first line segment in the HSB color space.

In a possible design, the determining, by the terminal, $b_0$ in the vector $a_0=(h_0,s_0,b_0)$ of the first line segment in the HSB color space based on $b_1$ and $b_2$ includes: determining, by the terminal, whether a difference between $b_1$ and $b_2$ is greater than a first preset value $T_1$, where $T_1 \in [0,1]$; and if the difference between $b_1$ and $b_2$ is greater than the first preset value, determining, by the terminal, the larger one of $b_1$ and $b_2$ as $b_0$ in the vector $a_0=(h_0,s_0,b_0)$ of the first line segment in the HSB color space; or if the difference between $b_1$ and $b_2$ is not greater than the first preset value, determining, by the terminal, $b_0$ in the vector $a_0=(h_0,s_0,b_0)$ of the first line segment in the HSB color space based on $b_1$, $b_2$, and the following third preset formula, where the third preset formula includes:

$$b_0 = \begin{cases} \dfrac{b_1 + b_2}{2} + T_2 & \text{when } \dfrac{b_1 + b_2}{2} + T_2 \leq 1 \\ \dfrac{b_1 + b_2}{2} + T_2 - 1.0 & \text{when } \dfrac{b_1 + b_2}{2} + T_2 > 1 \end{cases},$$

$$T_2 \in [0, 1] \text{ and } T_2 \geq \dfrac{T_1}{2}.$$

In a possible design, the determining, by the terminal, a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$ includes: separately determining, by the terminal, $V_{1r}$, $V_{1g}$, and $V_{1b}$ in the vector $V_1=(V_{1r},V_{1g},V_{1b})$ of the RGB color space of the rectangular area $R_1$, and $V_{2r}$, $V_{2g}$, and $V_{2b}$ in the RGB vector $V_2=(V_{2r},V_{2g},V_{2b})$ of the RGB color space of the rectangular area $R_2$ in the following manners S1 to S4: S1: determining, by the terminal, a histogram $H_{ki}$ of an i channel in an RGB color space of a rectangular area $R_k$, where k=1 or 2, and i=r, or g, or b; S2: obtaining, by the terminal, a grayscale $G_{ki}$ having a largest probability in the histogram $H_{ki}$; S3: determining, by the terminal by using $G_{ki}$ as a center with reference to the following fourth preset formula, a sum $S_{ki}$ of probabilities of all grayscales between two grayscales having a same distance to $G_{ki}$, until $S_{ki} > T_{ki}$, where $T_{ki}$ a preset rational number having a value range of 0 to 1; and S4: determining, by the terminal, $V_{ki}$ in an RGB vector $V_k$ of the RGB color space of the rectangular area $R_k$ based on $S_{ki}$ and the following fifth preset formula; and determining, by the terminal, the vector $V_1=(V_{1r},V_{1g},V_{1b})$ of the RGB color space of the rectangular area $R_1$ based on $V_{1r}$, $V_{1g}$, and $V_{1b}$, and determining, by the terminal, the vector $V_2=(V_{2r},V_{2g},V_{2b})$ of the RGB color space of the rectangular area $R_2$ based on $V_{2r}$, $V_{2g}$, and $V_{2b}$, where the fourth preset formula includes:

$$S_{ki} = \sum_{g_{k1}}^{g_{k2}} H_{ki}(x)$$

$x \in [g_{k1}, g_{k2}]$, where $G_{ki} - g_{k1} = g_{k2} - G_{ki}$; and the fifth preset formula includes:

$$V_{ki} = \sum_{g_{k1}}^{g_{k2}} x * H'_{ki}(x) \quad x \in [g_{k1}, g_{k2}], \text{ where } H'_{ki}(x) = \dfrac{H_{ki}(x)}{S_{ki}},$$

where $H_{ki}(x)$ indicates a probability value of a grayscale having a grayscale of x in an i channel in a grayscale histogram of a $k^{th}$ area, $H'_{ki}(x)$ indicates normalization for $H_{ki}(x)$, and $\Sigma$ indicates obtaining a sum of all values in a range.

In a possible design, the converting, by the terminal, the vector $V_1$ to a vector $a_1=(h_1,s_1,b_1)$ of an HSB color space, and converting, by the terminal, the vector $V_2$ to a vector $a_2=(h_2,s_2,b_2)$ of the HSB color space includes: converting, by the terminal, the vector $V_1$ to the vector $a_1=(h_1,s_1,b_1)$ of the HSB color space, and converting the vector $V_2$ to the vector $a_2=(h_2,s_2,b_2)$ of the HSB color space based on the following sixth preset formula, seventh preset formula, and eighth preset formula, where the sixth preset formula includes: $b_k = \max(V_{kr}, V_{kg}, V_{kb})$; the seventh preset formula includes:

$$s_k = \begin{cases} \dfrac{b_k - \min(V_{kr}, V_{kg}, V_{kb})}{b_k} & \text{when } b_k \neq 0 \\ 0 & \text{when } b_k = 0 \end{cases};$$

and the eighth preset formula includes:

$$h_k = \begin{cases} 60(V_{kg} - V_{kb})/(b_k - \min(V_{kr}, V_{kg}, V_{kb})) & \text{when } b_k = V_{kr} \\ 120 + 60(V_{kb} - V_{kr})/(b_k - \min(V_{kr}, V_{kg}, V_{kb})) & \text{when } b_k = V_{kg} \\ 240 + 60(V_{kr} - V_{kg})/(b_k - \min(V_{kr}, V_{kg}, V_{kb})) & \text{when } b_k = V_{kb} \end{cases}$$

where $k = 1$ or 2, max indicates obtaining a maximum value for all variables, and min indicates obtaining a minimum value for all the variables.

In a possible design, the converting, by the terminal, the vector $a_0$ to a vector $V_0=(V_{0r},V_{0g},V_{0b})$ of the RGB color space includes: converting, by the terminal, the vector $a_0$ to the vector $V_0=(V_{0r},V_{0g},V_{0b})$ of the RGB color space based on the following ninth preset formula to fourteenth preset formula, where the ninth preset formula includes:

$$h_m = \left\lfloor \dfrac{h_0}{60} \right\rfloor \mod 6,$$

where $$\left\lfloor \dfrac{h_0}{60} \right\rfloor \mod 6$$

indicates obtaining a remainder of division of a largest integer less than $$\frac{h_0}{60}$$

by 6; the tenth preset formula includes:

$$f = \frac{h_0}{60} - h_m;$$

the eleventh preset formula includes: $p=b_0*(1-s_0)$; the twelfth preset formula includes: $q=b_0*(1-f*s_0)$; the thirteenth preset formula includes: $t=b_0*(1-(1-f)*s_0)$; and the fourteenth preset formula includes:

$$(V_{0r}, V_{0g}, V_{0b}) = \begin{cases} (b_0, t, p), & h_m = 0 \\ (q, b_0, p), & h_m = 1 \\ (p, b_0, t), & h_m = 2 \\ (p, q, b_0), & h_m = 3 \\ (t, p, b_0), & h_m = 4 \\ (b_0, p, q), & h_m = 5 \end{cases}.$$

In a possible design, the displaying, by the terminal, the target quadrilateral based on a vector of each edge line segment in the target quadrilateral in the RGB color space includes: displaying, by the terminal, each edge line segment in the target quadrilateral based on the vector of each edge line segment in the target quadrilateral in the RGB color space.

In a possible design, the displaying, by the terminal, the target quadrilateral based on a vector of each edge line segment in the target quadrilateral in the RGB color space includes: calculating, by the terminal based on a fifteenth preset formula and a value of an H channel in a vector of each edge line segment in the target quadrilateral in the HSB color space, a Δh value corresponding to each edge line segment in the target quadrilateral; and displaying, by the terminal, each edge line segment in the target quadrilateral based on a vector that is of an edge line segment corresponding to a smallest Δh value in the four Δh values corresponding to the four edge line segments in the target quadrilateral and that is in the RGB color space, where the fifteenth preset formula includes: $\Delta h = |h_1 - h_2|$.

According to another aspect, an embodiment of the present invention provides a terminal for displaying an edge of a rectangle. The terminal includes a camera module, a processing module, and a display module, where the camera module is configured to obtain a red green blue RGB image of a captured target rectangle; the processing module is configured to detect an edge of the RGB image, to obtain a target quadrilateral corresponding to the target rectangle; the processing module is further configured to process each edge line segment in the target quadrilateral based on the following operations on a first line segment: separately creating a rectangular area $R_1$ and a rectangular area $R_2$ by using the first line segment as one side; determining a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$; converting the vector $V_1$ to a vector $a_1=(h_1,s_1,b_1)$ of a hue saturation brightness HSB color space, and converting, by the terminal, the vector $V_2$ to a vector $a_2=(h_2,s_2,b_2)$ of the HSB color space; determining a vector $a_0=(h_0,s_0,b_0)$ of the first line segment in the HSB color space based on the vector $a_1$ and the vector $a_2$; and converting the vector $a_0$ to a vector $V_0=(V_{0r},V_{0g},V_{0b})$ of the RGB color space; and after the processing module processes each edge line segment in the target quadrilateral based on the foregoing operations on the first line segment, the display module displays the target quadrilateral based on a vector of each edge line segment in the target quadrilateral in the RGB color space.

In a possible design, the processing module is specifically configured to: determine $h_0$ in the vector $a_0=(h_0,s_0,b_0)$ of the first line segment in the HSB color space based on $h_1$ and $h_2$; determine $s_0$ in the vector $a_0=(h_0,s_0,b_0)$ of the first line segment in the HSB color space based on $s_1$ and $s_2$; and determine $b_0$ in the vector $a_0=(h_0,s_0,b_0)$ of the first line segment in the HSB color space based on $b_1$ and $b_2$.

In a possible design, the processing module is specifically configured to: determine a complementary color of $h_1$ and a complementary color of $h_2$ based on $h_1$, $h_2$, and the following first preset formula; and determine $h_0$ in the vector $a_0=(h_0,s_0,b_0)$ of the first line segment in the HSB color space based on the complementary color of $h_1$, the complementary color of $h_2$, and the following second preset formula, where the first preset formula includes:

$$\begin{cases} h_{1c} = h_1 + 180 \\ h_{2c} = h_2 + 180 \end{cases},$$

where $h_{1c}$ indicate the complementary color of $h_1$, and $h_{2c}$ indicates the complementary color of $h_2$; and the second preset formula includes:

$$h_0 = \begin{cases} \dfrac{h_{1c} + h_{2c}}{2} & \text{when } \dfrac{h_{1c} + h_{2c}}{2} < 360 \\ \dfrac{h_{1c} + h_{2c}}{2} - 360 & \text{when } \dfrac{h_{1c} + h_{2c}}{2} \geq 360 \end{cases}.$$

In a possible design, the processing module is specifically configured to determine the larger one of $s_1$ and $s_2$ as $s_0$ in the vector $a_0=(h_0,s_0,b_0)$ of the first line segment in the HSB color space.

In a possible design, the processing module is specifically configured to: determine whether a difference between $b_1$ and $b_2$ is greater than a first preset value $T_1$, where $T_1 \in [0,1]$; and if the difference between $b_1$ and $b_2$ is greater than the first preset value, determine the larger one of $b_1$ and $b_2$ as $b_0$ in the vector $a_0=(h_0,s_0,b_0)$ of the first line segment in the HSB color space; or if the difference between $b_1$ and $b_2$ is not greater than the first preset value, determine $b_0$ in the vector $a_0=(h_0,s_0,b_0)$ of the first line segment in the HSB color space based on $b_1$, $b_2$, and the following third preset formula, where the third preset formula includes:

$$b_0 = \begin{cases} \dfrac{b_1 + b_2}{2} + T_2 & \text{when } \dfrac{b_1 + b_2}{2} + T_2 \leq 1 \\ \dfrac{b_1 + b_2}{2} + T_2 - 1.0 & \text{when } \dfrac{b_1 + b_2}{2} + T_2 > 1 \end{cases},$$

$$T_2 \in [0, 1] \text{ and } T_2 \geq \frac{T_1}{2}.$$

In a possible design, the processing module is specifically configured to: separately determine $V_{1r}$, $V_{1g}$, and $V_{1b}$ in the vector $V_1=(V_{1r},V_{1g},V_{1b})$ of the RGB color space of the rectangular area $R_1$, and $V_{2r}$, $V_{2g}$, and $V_{2b}$ in the RGB vector $V_2=(V_{2r},V_{2g},V_{2b})$ of the RGB color space of the rectangular area $R_2$ in the following manners S1 to S4: S1: determining a histogram $H_{ki}$ of an i channel in an RGB color space of a rectangular area $R_k$, where k=1 or 2, and i=r, or g, or b; S2: obtaining a grayscale $G_{ki}$ having a largest probability in the histogram $H_{ki}$; S3: determining, by using $G_{ki}$ as a center with reference to the following fourth preset formula, a sum $S_{ki}$ of probabilities of all grayscales between two grayscales having a same distance to $G_{ki}$, until $S_{ki} > T_{ki}$, where $T_{ki}$ a preset rational number having a value range of 0 to 1; and S4: determining $V_{ki}$ in an RGB vector $V_k$ of the RGB color space of the rectangular area $R_k$ based on $S_{ki}$ and the following fifth preset; and determine the vector $V_1=(V_{1r},V_{1g},V_{1b})$ of the RGB color space of the rectangular area $R_1$ based on $V_{1r}$, $V_{1g}$, and $V_{1b}$, and determine the vector $V_2=(V_{2r},V_{2g},V_{2b})$ of the RGB color space of the rectangular area $R_2$ based on $V_{2r}$, $V_{2g}$, and $V_{2b}$, where the fourth preset formula includes:

$$S_{ki} = \sum_{g_{k1}}^{g_{k2}} H_{ki}(x)$$

$$x \in [g_{k1}, g_{k2}],$$

where $G_{ki} - g_{k1} = g_{k2} - G_{ki}$; and the fifth preset formula includes:

$$V_{ki} = \sum_{g_{k1}}^{g_{k2}} x * H'_{ki}(x) \ x \in [g_{k1}, g_{k2}], \text{ where } H'_{ki}(x) = \frac{H_{ki}(x)}{S_{ki}},$$

where $H_{ki}(x)$ indicates a probability value of a grayscale having a grayscale of x in an i channel in a grayscale histogram of a $k^{th}$ area, $H'_{ki}(x)$ indicates normalization for $H_{ki}(x)$, and $\Sigma$ indicates obtaining a sum of all values in a range.

In a possible design, the processing module is specifically configured to: convert the vector $V_1$ to the vector $a_1=(h_1,s_1,b_1)$ of the HSB color space, and convert the vector $V_2$ to the vector $a_2=(h_2,s_2,b_2)$ of the HSB color space based on the following sixth preset formula, seventh preset formula, and eighth preset formula, where the sixth preset formula includes: $b_k = \max(V_{kr},V_{kg},V_{kb})$; the seventh preset formula includes:

$$s_k = \begin{cases} \dfrac{b_k - \min(V_{kr}, V_{kg}, V_{kb})}{b_k} & \text{when } b_k \neq 0 \\ 0 & \text{when } b_k = 0 \end{cases};$$

and the eighth preset formula includes:

$$h_k = \begin{cases} 60(V_{kg} - V_{kb})/(b_k - \min(V_{kr}, V_{kg}, V_{kb})) & \text{when } b_k = V_{kr} \\ 120 + 60(V_{kb} - V_{kr})/(b_k - \min(V_{kr}, V_{kg}, V_{kb})) & \text{when } b_k = V_{kg} \\ 240 + 60(V_{kr} - V_{kg})/(b_k - \min(V_{kr}, V_{kg}, V_{kb})) & \text{when } b_k = V_{kb} \end{cases}$$

where k = 1 or 2, max indicates obtaining a maximum value for all variables, and min indicates obtaining a minimum value for all the variables.

In a possible design, the processing module is specifically configured to: convert the vector $a_0$ to the vector $V_0=(V_{0r},V_{0g},V_{0b})$ of the RGB color space based on the following ninth preset formula to fourteenth preset formula, where the ninth preset formula includes:

$$h_m = \left\lfloor \frac{h_0}{60} \right\rfloor \bmod 6,$$

where $$\left\lfloor \frac{h_0}{60} \right\rfloor \bmod 6$$

indicates obtaining a remainder of division of a largest integer less than $$\frac{h_0}{60}$$

by 6; the tenth preset formula includes:

$$f = \frac{h_0}{60} - h_m;$$

the eleventh preset formula includes: $p=b_0*(1-s_0)$; the twelfth preset formula includes: $q=b_0*(1-f*s_0)$; the thirteenth preset formula includes: $t=b_0*(1-(1-f)*s_0)$; and the fourteenth preset formula includes:

$$(V_{0r}, V_{0g}, V_{0b}) = \begin{cases} (b_0, t, p), h_m = 0 \\ (q, b_0, p), h_m = 1 \\ (p, b_0, t), h_m = 2 \\ (p, q, b_0), h_m = 3 \\ (t, p, b_0), h_m = 4 \\ (b_0, p, q), h_m = 5 \end{cases}.$$

In a possible design, the display module is specifically configured to display each edge line segment in the target quadrilateral based on the vector of each edge line segment in the target quadrilateral in the RGB color space.

In a possible design, the display module is specifically configured to: calculate, by using the processing module based on a fifteenth preset formula and a value of an H channel in a vector of each edge line segment in the target quadrilateral in the HSB color space, a Δh value corresponding to each edge line segment in the target quadrilateral; and display each edge line segment in the target quadrilateral based on a vector that is of an edge line segment corresponding to a smallest Δh value in the four Δh values corresponding to the four edge line segments in the target quadrilateral and that is in the RGB color space, where the fifteenth preset formula includes: $\Delta h=|h_1-h_2|$.

According to still another aspect, an embodiment of the present invention provides a terminal. The terminal can implement a function performed by the processing module in the foregoing method embodiment, and the function may be implemented by hardware or may be implemented by executing corresponding software by hardware. The hardware or software includes one or more modules corresponding to the foregoing function.

According to another aspect, an embodiment of the present invention provides a terminal for displaying an edge of a rectangle. The terminal includes a camera, a processor, and a display screen, where the camera is configured to obtain a red green blue RGB image of a captured target rectangle; the processor is configured to detect an edge of the RGB image, to obtain a target quadrilateral corresponding to the target rectangle; the processor is further configured to process each edge line segment in the target quadrilateral based on the following operations on a first line segment: separately creating a rectangular area $R_1$ and a rectangular area $R_2$ by using the first line segment as one side; determining a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$; converting the vector $V_1$ to a vector $a_1=(h_1,s_1,b_1)$ of a hue saturation brightness HSB color space, and converting, by the terminal, the vector $V_2$ to a vector $a_2=(h_2,s_2,b_2)$ of the HSB color space; determining a vector $a_0=(h_0,s_0,b_0)$ of the first line segment in the HSB color space based on the vector $a_1$ and the vector $a_2$; and converting the vector $a_0$ to a vector $V_0=(V_{0r},V_{0g},V_{0b})$ of the RGB color space; and after the processor processes each edge line segment in the target quadrilateral based on the foregoing operations on the first line segment, the display screen displays the target quadrilateral based on a vector of each edge line segment in the target quadrilateral in the RGB color space.

In a possible design, the processor is specifically configured to: determine $h_0$ in the vector $a_0=(h_0,s_0,b_0)$ of the first line segment in the HSB color space based on $h_1$ and $h_2$; determine $s_0$ in the vector $a_0=(h_0,s_0,b_0)$ of the first line segment in the HSB color space based on $s_1$ and $s_2$; and determine $b_0$ in the vector $a_0=(h_0,s_0,b_0)$ of the first line segment in the HSB color space based on $b_1$ and $b_2$.

In a possible design, the processor is specifically configured to: determine a complementary color of $h_1$ and a complementary color of $h_2$ based on $h_1$, $h_2$, and the following first preset formula; and determine $h_0$ in the vector $a_0=(h_0,s_0,b_0)$ of the first line segment in the HSB color space based on the complementary color of $h_1$, the complementary color of $h_2$, and the following second preset formula, where the first preset formula includes:

$$\begin{cases} h_{1c} = h_1 + 180 \\ h_{2c} = h_2 + 180 \end{cases},$$

where $h_{1c}$ indicates the complementary color of $h_1$, and $h_{2c}$ indicates the complementary color of $h_2$; and the second preset formula includes:

$$h_0 = \begin{cases} \frac{h_{1c}+h_{2c}}{2} & \text{when } \frac{h_{1c}+h_{2c}}{2} < 360 \\ \frac{h_{1c}+h_{2c}}{2} - 360 & \text{when } \frac{h_{1c}+h_{2c}}{2} \geq 360 \end{cases}.$$

In a possible design, the processor is specifically configured to determine the larger one of $s_1$ and $s_2$ as $s_0$ in the vector $a_0=(h_0,s_0,b_0)$ of the first line segment in the HSB color space.

In a possible design, the processor is specifically configured to: determine whether a difference between $b_1$ and $b_2$ is greater than a first preset value $T_1$, where $T_1 \in [0,1]$; and if the difference between $b_1$ and $b_2$ is greater than the first preset value, determine the larger one of $b_1$ and $b_2$ as $b_0$ in the vector $a_0=(h_0,s_0,b_0)$ of the first line segment in the HSB color space; or if the difference between $b_1$ and $b_2$ is not greater than the first preset value, determine $b_0$ in the vector $a_0=(h_0,s_0,b_0)$ of the first line segment in the HSB color space based on $b_1$, $b_2$, and the following third preset formula, where the third preset formula includes:

$$b_0 = \begin{cases} \frac{b_1+b_2}{2} + T_2 & \text{when } \frac{b_1+b_2}{2} + T_2 \leq 1 \\ \frac{b_1+b_2}{2} + T_2 - 1.0 & \text{when } \frac{b_1+b_2}{2} + T_2 > 1 \end{cases},$$

$$T_2 \in [0,1] \text{ and } T_2 \geq \frac{T_1}{2}.$$

In a possible design, the processor is specifically configured to: separately determine $V_{1r}$, $V_{1g}$, and $V_{1b}$ in the vector $V_1=(V_{1r},V_{1g},V_{1b})$ of the RGB color space of the rectangular area $R_1$, and $V_{2r}$, $V_{2g}$, and $V_{2b}$ in the RGB vector $V_2=(V_{2r},V_{2g},V_{2b})$ of the RGB color space of the rectangular area $R_2$ in the following manners S1 to S4: S1: determining a histogram $H_{ki}$ an of i channel in an RGB color space of a rectangular area $R_k$, where k=1 or 2, and i=r, or g, or b; S2: obtaining a grayscale $G_{ki}$ having a largest probability in the histogram $H_{ki}$; S3: determining, by using $G_{ki}$ as a center with reference to the following fourth preset formula, a sum $S_{ki}$ of probabilities of all grayscales between two grayscales having a same distance to $G_{ki}$, until $S_{ki} > T_{ki}$, where $T_{ki}$ is a preset rational number having a value range of 0 to 1; and S4: determining $V_{ki}$ in an RGB vector $V_k$ of the RGB color space of the rectangular area $R_k$ based on $S_{ki}$ and the following fifth preset formula; and determine the vector $V_1=(V_{1r},V_{1g},V_{1b})$ of the RGB color space of the rectangular area $R_1$ based on $V_{1r}$, $V_{1g}$, and $V_{1b}$, and determine the vector $V_2=(V_{2r},V_{2g},V_{2b})$ of the RGB color space of the rectangular area $R_2$ based on $V_{2r}$, $V_{2g}$, and $V_{2b}$, where the fourth preset formula includes:

$$S_{ki} = \sum_{g_{k1}}^{g_{k2}} H_{ki}(x)$$

$$x \in [g_{k1}, g_{k2}],$$

where $G_{ki} - g_{k1} = g_{k2} - G_{ki}$; and the fifth preset formula includes:

$$V_{ki} = \sum_{g_{k1}}^{g_{k2}} x * H'_{ki}(x) \quad x \in [g_{k1}, g_{k2}], \text{ where } H'_{ki}(x) = \frac{H_{ki}(x)}{S_{ki}},$$

where $H_{ki}(x)$ indicates a probability value of a grayscale having a grayscale of x in an i channel in a grayscale histogram of a $k^{th}$ area, $H'_{ki}(x)$ indicates normalization for $H_{ki}(x)$, and $\Sigma$ indicates obtaining a sum of all values in a range.

In a possible design, the processor is specifically configured to: convert the vector $V_1$ to the vector $a_1=(h_1,s_1,b_1)$ of the HSB color space, and convert the vector $V_2$ to the vector $a_2=(h_2,s_2,b_2)$ of the HSB color space based on the following sixth preset formula, seventh preset formula, and eighth preset formula, where the sixth preset formula includes: $b_k=\max(V_{kr},V_{kg},V_{kb})$; the seventh preset formula includes:

$$s_k = \begin{cases} \dfrac{b_k - \min(V_{kr}, V_{kg}, V_{kb})}{b_k} & \text{when } b_k \neq 0 \\ 0 & \text{when } b_k = 0 \end{cases};$$

and the eighth preset formula includes:

$$h_k = \begin{cases} 60(V_{kg} - V_{kb})/(b_k - \min(V_{kr}, V_{kg}, V_{kb})) & \text{when } b_k = V_{kr} \\ 120 + 60(V_{kb} - V_{kr})/(b_k - \min(V_{kr}, V_{kg}, V_{kb})) & \text{when } b_k = V_{kg} \\ 240 + 60(V_{kb} - V_{kr})/(b_k - \min(V_{kr}, V_{kg}, V_{kb})) & \text{when } b_k = V_{kb} \end{cases}$$

where $k = 1$ or $2$, max indicates obtaining a maximum value for all variables, and min indicates obtaining a minimum value for all the variables.

In a possible design, the processor is specifically configured to: convert the vector a to the vector $V_0=(V_{0r},V_{0g},V_{0b})$ of the RGB color space based on the following ninth preset formula to fourteenth preset formula, where the ninth preset formula includes:

$$h_m = \left\lfloor \frac{h_0}{60} \right\rfloor \bmod 6,$$

where $$\left\lfloor \frac{h_0}{60} \right\rfloor \bmod 6$$

indicates obtaining a remainder of division of a largest integer less than $$\frac{h_0}{60}$$

by 6; the tenth preset formula includes:

$$f = \frac{h_0}{60} - h_m;$$

the eleventh preset formula includes: $p=b_0*(1-s_0)$; the twelfth preset formula includes: $q=b_0*(1-f*s_0)$; the thirteenth preset formula includes: $t=b_0*(1-(1-f)*s_0)$; and the fourteenth preset formula includes:

$$(V_{0r}, V_{0g}, V_{0b}) = \begin{cases} (b_0, t, p), & h_m = 0 \\ (q, b_0, p), & h_m = 1 \\ (p, b_0, t), & h_m = 2 \\ (p, q, b_0), & h_m = 3 \\ (t, p, b_0), & h_m = 4 \\ (b_0, p, q), & h_m = 5 \end{cases}.$$

In a possible design, the display screen is specifically configured to display each edge line segment in the target quadrilateral based on the vector of each edge line segment in the target quadrilateral in the RGB color space.

In a possible design, the display screen is specifically configured to: calculate, by using the processor based on a fifteenth preset formula and a value of an H channel in a vector of each edge line segment in the target quadrilateral in the HSB color space, a Δh value corresponding to each edge line segment in the target quadrilateral; and display each edge line segment in the target quadrilateral based on a vector that is of an edge line segment corresponding to a smallest Δh value in the four Δh values corresponding to the four edge line segments in the target quadrilateral and that is in the RGB color space, where the fifteenth preset formula includes: $\Delta h=|h_1-h_2|$.

In a possible design, the terminal may further include a memory, and the memory is configured to be coupled with the processor, and stores a program instruction and data necessary for the terminal.

According to yet another aspect, an embodiment of the present invention provides a computer storage medium, configured to store a computer software instruction used by the foregoing processor and storing a program designed to perform the foregoing aspects.

According to the method and the terminal for displaying an edge of a rectangular frame provided in the embodiments of the present invention, impact of a first line segment in a border of a rectangle and three channels in an HSB color mode of areas at two sides on contrast of a border color is considered, to resolve a problem that in some scenarios, contrast between a border color of a detected border of a quadrilateral that is drawn by using a fixed color in an existing application and colors of areas at two sides of the border is low, so that a border color having high contrast can be adaptively determined based on an ambient environment.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To clearly and briefly describe the following embodiments, brief descriptions of related concepts or technologies are provided first.

1. Gray Scale Histogram

Figure 1:
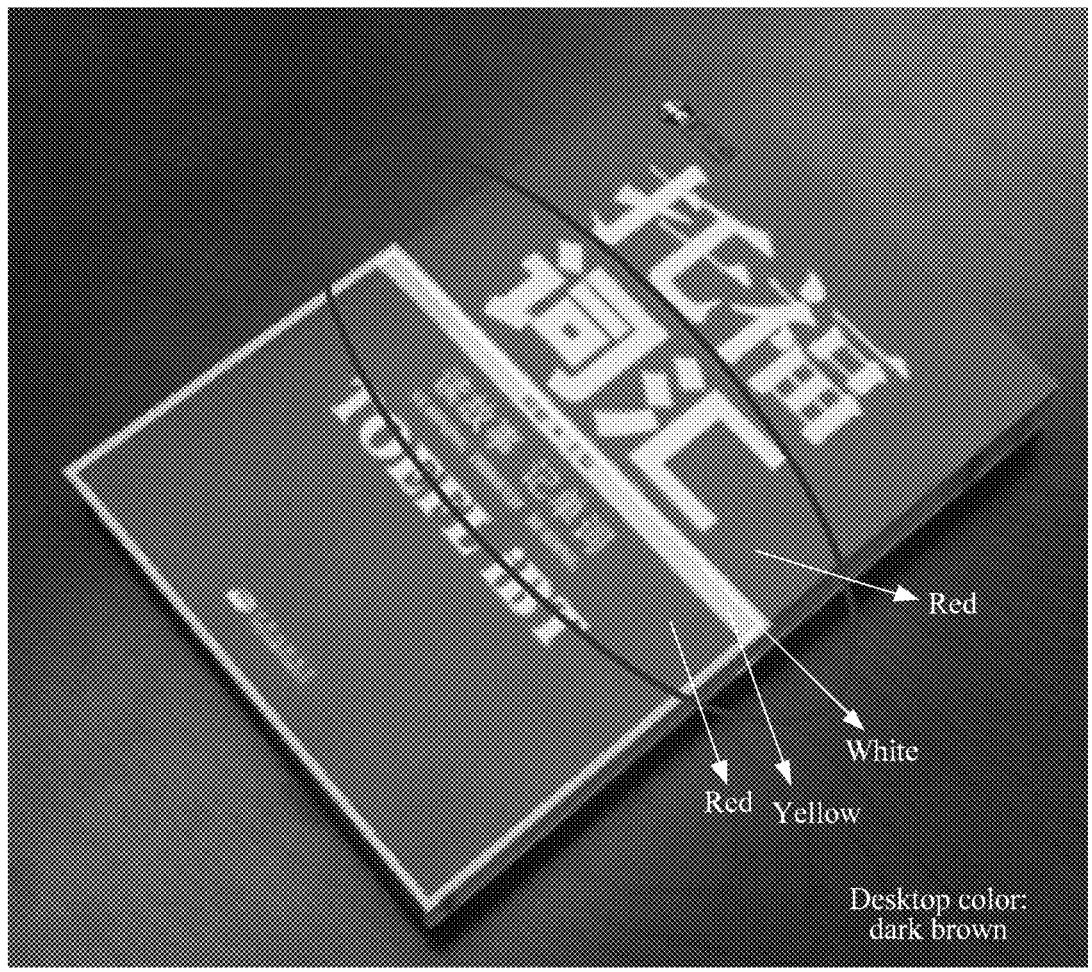
FIG. 1 is a schematic diagram of a detected edge of a rectangle in a preview interface image according to an embodiment of the present invention.
Figure 2:
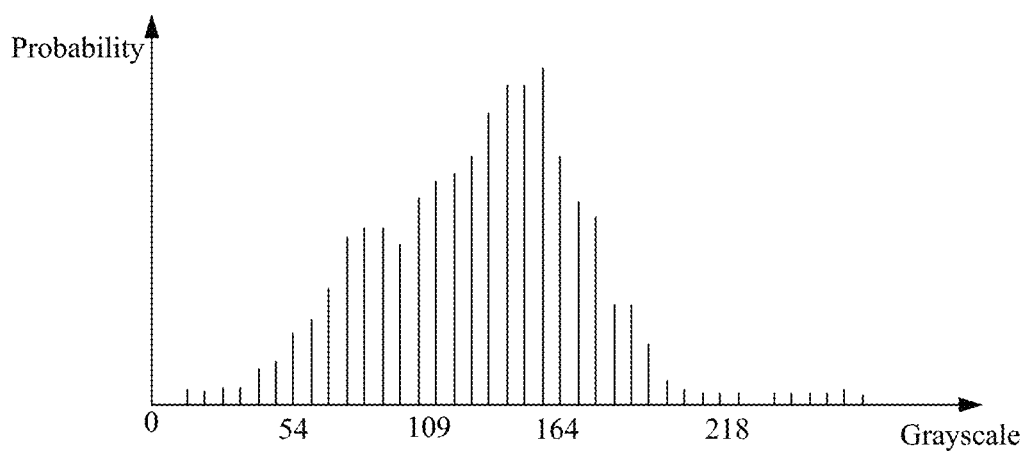
FIG. 2 is a grayscale histogram according to an embodiment of the present invention.

As shown in FIG. 2, a grayscale histogram is a function related to grayscale distribution, and is statistics on grayscale distribution of pixels in an image. In a grayscale histogram, statistics on frequency (probabilities) that all pixels in a digital image appear are collected based on grayscale values.

2. Hue Saturation Brightness HSB (English: Hue Saturation Brightness, HSB for Short)

Figure 3:
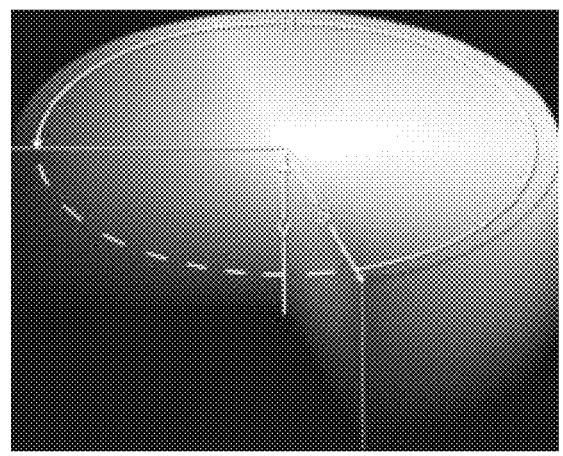
FIG. 3 is a schematic diagram of an HSB color mode according to an embodiment of the present invention.

As shown in FIG. 3, an HSB color mode is a color mode based on human eyes, where H indicates a hue, S indicates saturation, and B indicates brightness.

A hue H is identified by an angular value on a standard color circle of 0° to 360°. For example, red is 0°, green is 120°, and blue is 240°.

Saturation S refers to intensity or purity of a color. Saturation indicates a proportion of a color in a hue, and is measured by using a percentage from 0% (gray) to 100% (complete saturation). On a color facade, saturation progressively increases from the center to an edge, and saturation at the center is 0%, and saturation at the edge is 100%.

Brightness B is luminance of a color and is generally measured by a percentage from 0% (black) to 100% (white), and progressively decreases from the top to the bottom on the color facade. Brightness at an upper edge is 100%, and brightness at a lower edge is 0%.

3. Red Green Blue (English: Red Green Blue, RGB for Short) Color Mode

The RGB color mode is a color standard in the industry, in which channels of three colors: red (R), green (G), and blue (B) are changed and the three color channels are added to each other to obtain a broad array of colors. RGB indicates colors of red, green, and blue channels. This standard includes almost all colors that can be perceived by human vision, and is one of the most widely used color systems at present.

4. 24-Color Color Circle and Complementary Color

Figure 4:
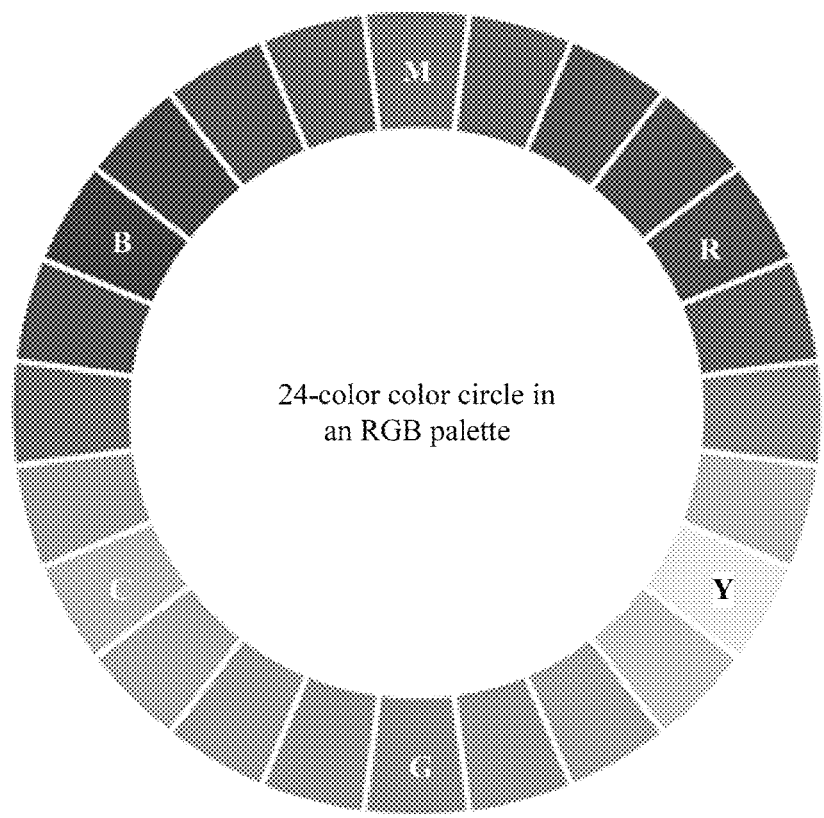
FIG. 4 is a schematic diagram of 24-color color circle according to an embodiment of the present invention.

As shown in FIG. 4, basic hues in an Ostwald color system are mainly eight hues in total, that is, yellow, orange, red, purple, blue, bluish green, green, and yellowish green. Each basic hue is divided into three parts, to form a color circle divided into 24 parts, which are numbered from 1 to 24. In an RGB palette, in the 24-color color circle, two hues that are different from each other by twelve color numbers or different from each other by 180 degrees are complementary colors of each other. A color group combined by complementary colors is a color group having highest contrast. Visual simulation and instability are generated for a human. Two hues having neighboring color numbers or different from each other by 15 degrees are comparison between similar colors. A hue feeling is pure, soft, unified, and tends to be harmonious.

As described in the Background, at present, before an image with a rectangular frame is corrected, a fixed color that is set by an application is used to draw a detected border of a quadrilateral. However, because the color is relatively undiversified, and colors of areas at two sides of the border are relatively diversified, in some scenarios, a border color and the colors of the areas at the two sides of the border may all be warm colors or cool colors. Consequently, contrast between the border color and the colors of the areas at the two sides of the border is low.

To resolve the problem, embodiments of the present invention provide a method and a terminal for displaying an edge of a rectangular frame. A core idea is that: a terminal obtains an RGB image of a captured target rectangle; the terminal detects an edge of the RGB image, to obtain a target quadrilateral corresponding to the target rectangle; the terminal processes each edge line segment in the target quadrilateral based on the following operations on a first line segment: separately creating, by the terminal, a rectangular area $R_1$ and a rectangular area $R_2$ by using the first line segment as one side; determining, by the terminal, a vector $V_1=(V_{1r}, V_{1g}, V_{1b})$ of an RGB color space of the rectangular area $R_1$ and a vector $V_2=(V_{2r}, V_{2g}, V_{2b})$ of the RGB color space of the rectangular area $R_2$; converting, by the terminal, the vector $V_1$ to a vector $a_1=(h_1, s_1, b_1)$ of an HSB color space, and converting, by the terminal, the vector $V_2$ to a vector $a_2=(h_2, s_2, b_2)$ of the HSB color space; determining, by the terminal, a vector $a_0=(h_0, s_0, b_0)$ of the first line segment in the HSB color space based on the vector $a_1$ and the vector $a_2$; and converting, by the terminal, the vector $a_0$ to a vector $V_0=(V_{0r}, V_{0g}, V_{0b})$ of the RGB color space; and after the terminal processes each edge line segment in the target quadrilateral based on the foregoing operations on the first line segment, the terminal displays the target quadrilateral based on a vector of each edge line segment in the target quadrilateral in the RGB color space. In this way, when the terminal performs a preview during photographing or corrects a rectangular image in a captured picture, if colors of areas at two sides of a border are both warm colors or cool colors, the terminal can adaptively determine a border color, and generate a border color having better contrast with the colors of the areas at the two sides of the border, thereby improving the contrast between the border color and the colors of the areas at the two sides of the border, and improving user experience. The following clearly and completely describes the technical solutions in the embodiments of the present invention with reference to the accompanying drawings in the embodiments of the present invention.

It should be noted that, to facilitate clear description of the technical solutions in the embodiments of the present invention, words such as "first" and "second" are used in the embodiments of the present invention to distinguish between same items or similar items that provide basically same functions or purposes. A person skilled in the art may understand that the words such as "first" and "second" do not limit a quantity and an execution order.

It should be noted that, "/" in this specification means "or", for example, A/B may indicate A or B. "And/or" in this specification describes only an association relationship for describing associated objects and represents that three relationships may exist. For example, A and/or B may represent the following three cases: Only A exists, both A and B exist, and only B exists. "Plurality of" indicates two or more.

Terms such as "component", "module", and "system" used in this application are used to indicate computer-related entities. The computer-related entities may be hardware, firmware, combinations of hardware and software, software, or software being executed. For example, a component may be, but is not limited to, a process that runs on a processor, a processor, an object, an executable file, a thread during execution, a program, and/or a computer. In an example, both an application that runs on a computing device and the computing device may be components. One or more components may reside within a process and/or a thread during execution, and the one or more components may be located on one computer and/or distributed between two or more computers. In addition, these components may be executed from various computer-readable media that have various data structures. The components may communicate based on, for example, a signal having one or more data packets (for example, data from a component, where the component interacts with another component in a local system or a distributed system and/or interacts with another system in a signal manner by using a network such as the Internet) by using a local and/or remote process.

It should be noted that, in the embodiments of the present invention, "by way of example" or "for example" or other terms may be used to indicate examples, illustrations, or descriptions. In the embodiments of the present invention, any embodiment or design solution described by using "by way of example" or described by using "an example" should not be construed as being better or more advantageous than other embodiments or design solutions. Specifically, terms such as "by way of example" or "for example" are used to present related concepts in specific manners.

It should be noted that, in the embodiments of the present invention, unless otherwise stated, "plurality of" means two or more. For example, a plurality of data packets refer to two or more data packets.

It should be noted that, in the embodiments of the present invention, "of (English: of)", "relevant (English: corresponding, relevant)", and "corresponding (English: corresponding)" may be mixed during use. It should be noted that, when a difference is de-emphasized, meanings of them are the same.

Figure 5:
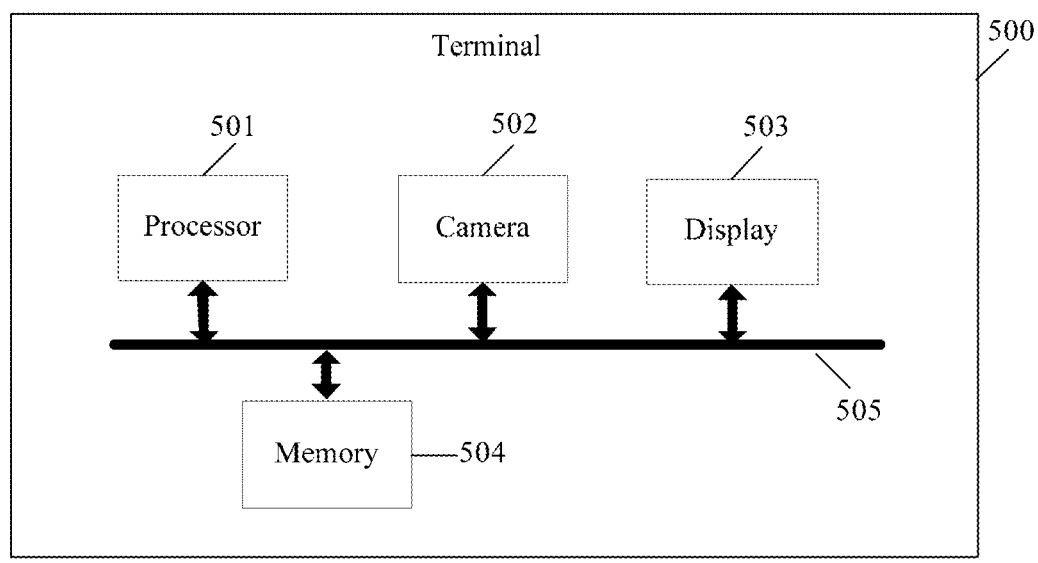
FIG. 5 is a hardware structural diagram of a terminal according to an embodiment of the present invention.

FIG. 5 is a schematic hardware structural diagram of a terminal according to an embodiment of the present invention. The terminal 500 includes a processor 501, a camera 502, a display 503, a memory 504, and a bus 505. The processor 501, the camera 502, the display 503, and the memory 504 are connected to each other by using the bus 505.

The processor 501 is a control center of the terminal 500, and is connected to various parts of the terminal 500 by using the bus 505. By running or executing a software program and/or module stored in the memory 504, and invoking data stored in the memory 504, the processor 501 performs various functions and data processing of the terminal 500, thereby performing overall monitoring on the terminal 500. Optionally, the processor 501 may include one or more processing units. Preferably, the processor 501 may integrate an application processor and a modem processor. The application processor mainly processes an operating system, a user interface, an application program, and the like. The modem processor mainly processes wireless communication. It may be understood that the foregoing modem processor may be not integrated into the processor 501.

The camera 502 is configured to photograph a target object, to obtain image data of the target object. The camera 502 may be a depth camera or a dual camera. This is not specifically limited in this embodiment of the present invention. Optionally, if the camera 502 is a depth camera, the camera 502 is further configured to obtain depth data of an image.

The display 503 is configured to display a processed image obtained after the target object is photographed.

The memory 504 may be configured to store a software program and module. The processor 501 executes various functional applications and performs data processing of the terminal 500 by running the software program and module stored in the memory 504. The memory 504 mainly includes a program storage area and a data storage area. The program storage area may store an operating system, an application program required by at least one function (such as a photographing function and a document correction function), and the like. The data storage area may store data (such as a preset angle database of rectangular shapes) created based on use of the terminal 500, and the like. In addition, the memory 504 may include a high-speed random access memory, and may also include a non-volatile memory such as at least one disk storage device, a flash memory, or another volatile solid-state storage device.

The bus 505 may be a peripheral component interconnect (English: peripheral component interconnect, PCI for short) bus, an extended industry standard architecture (English: extended industry standard architecture, EISA for short) bus, or the like. The bus may be classified into an address bus, a data bus, a control bus, or the like. For ease of representation, in FIG. 5, the bus is represented by using only one bold line, but it does not indicate that there is only one bus or only one type of bus.

Although not shown, the terminal 500 may further include a radio frequency (English: radio frequency, RF for short) circuit, an audio circuit, a communications interface, and/or a plurality of sensors. This is not specifically limited in this embodiment of the present invention.

Figure 6:
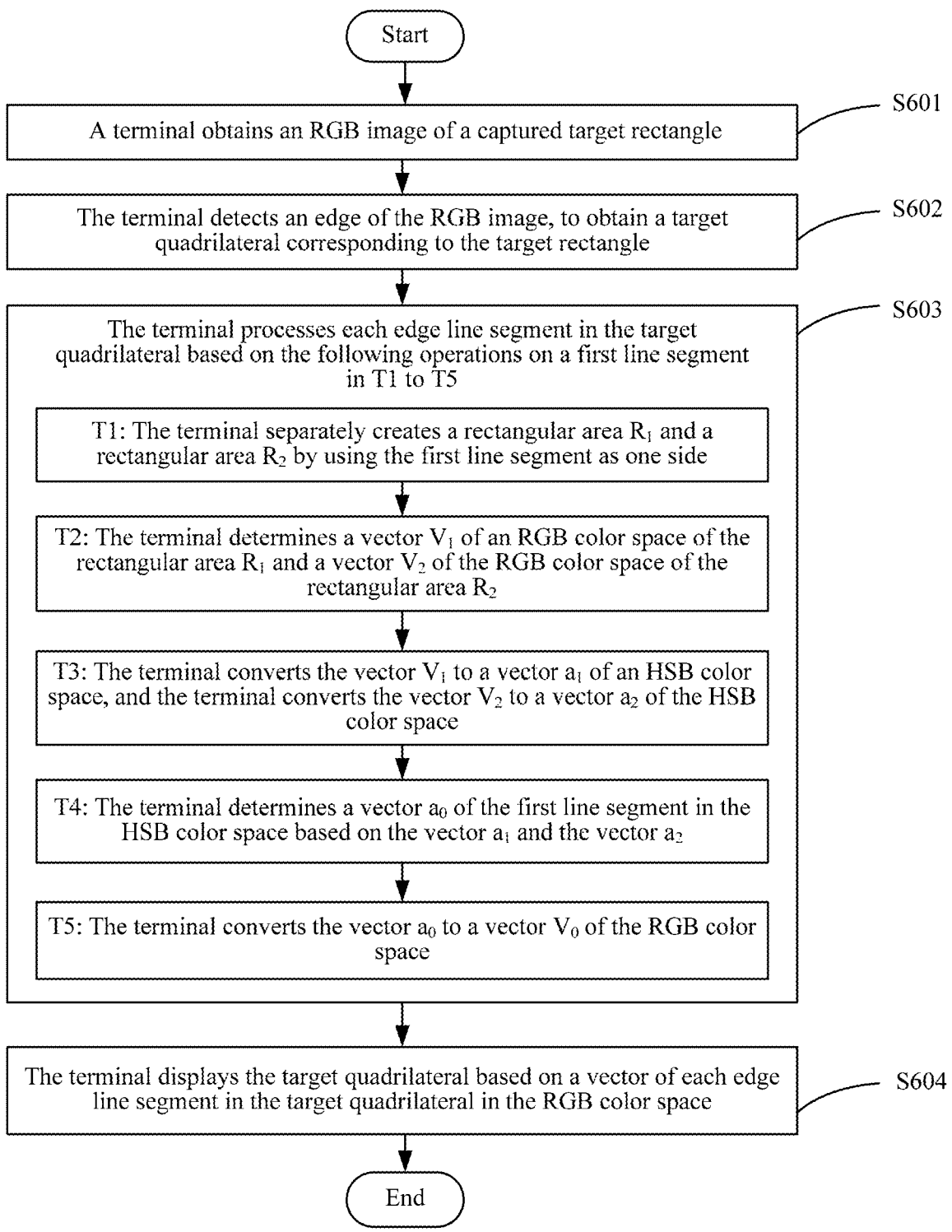
FIG. 6 is a flowchart of a method for displaying an edge of a rectangular frame according to an embodiment of the present invention.

A method for displaying an edge of a rectangular frame provided in an embodiment of the present invention is described in detail below based on the terminal shown in FIG. 5. FIG. 6 is a flowchart of a method for displaying an edge of a rectangular frame according to an embodiment of the present invention. The method includes step S601 to step S603.

S601: A terminal obtains an RGB image of a captured target rectangle.

S602: The terminal detects an edge of the RGB image, to obtain a target quadrilateral corresponding to the target rectangle.

S603: The terminal processes each edge line segment in the target quadrilateral based on the following operations on a first line segment in T1 to T6:

T1: The terminal separately creates a rectangular area $R_1$ and a rectangular area $R_2$ by using the first line segment as one side.

T2: The terminal determines a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$.

T3: The terminal converts the vector $V_1$ to a vector $a_1=(h_1,s_1,b_1)$ of an HSB color space, and the terminal converts the vector $V_2$ to a vector $a_2=(h_2,s_2,b_2)$ of the HSB color space.

T4: The terminal determines a vector $a_0=(h_0,s_0,b_0)$ of the first line segment in the HSB color space based on the vector $a_1$ and the vector $a_2$.

T5: The terminal converts the vector $a_0$ to a vector $V_0=(V_{0r},V_{0g},V_{0b})$ of the RGB color space.

S604: After processing each edge line segment in the target quadrilateral based on the foregoing operations on the first line segment, the terminal displays the target quadrilateral based on a vector of each edge line segment in the target quadrilateral in the RGB color space.

T1 may specifically include:

creating, by the terminal, the rectangular area $R_1$ and the rectangular area $R_2$ by using the first line segment as one side, and each of two line segments parallel to and having a same distance to the first line segment as another side.

Figure 7:
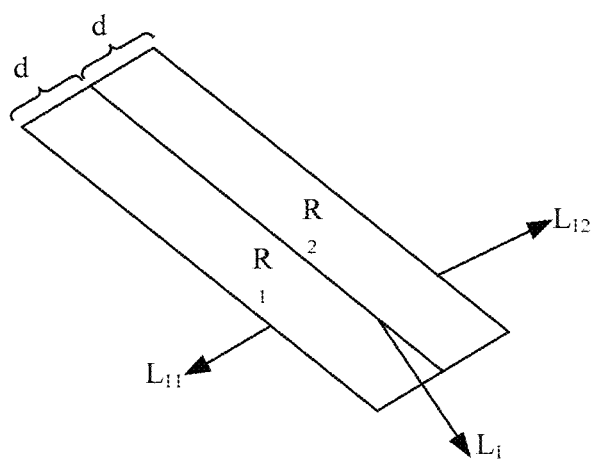
FIG. 7 is a schematic diagram of creating two rectangular areas according to an embodiment of the present invention.

For example, as shown in FIG. 7, the terminal may create two rectangular areas that are respectively $R_1$ and $R_2$ by using a line segment $L_1$ as one side, and each of line segments $L_{11}$ $L_{12}$ and parallel to and having a distance of d to $L_1$ as another side.

$$S_{ki} = \sum_{g_{k1}}^{g_{k2}} H_{ki}(x) \quad \text{formula (1)}$$

$$x \in [g_{k1}, g_{k2}]$$

where $G_{ki}-g_{k1}=g_{k2}-G_{ki}$.

S4: The terminal determines $V_{ki}$ in an RGB vector $V_k$ of the RGB color space of the rectangular area $R_k$ based on $S_{ki}$ and a formula (2).

$$V_{ki} = \sum_{g_{k1}}^{g_{k2}} x * H'_{ki}(x) x \in [g_{k1}, g_{k2}] \text{ where} \quad \text{formula (2)}$$

$$H'_{ki}(x) = \frac{H'_{ki}(x)}{S_{ki}},$$

where $H_{ki}(x)$ indicates a probability value of a grayscale having a grayscale of x in an i channel in a grayscale histogram of a $k^{th}$ area, $H'_{ki}(x)$ indicates normalization for $H_{ki}(x)$, and $\Sigma$ indicates obtaining a sum of all values in a range.

T3 may specifically include:

converting, by the terminal, the vector $V_1$ to the vector $a_1=(h_1,s_1,b_1)$ of the HSB color space, and converting the vector $V_2$ to the vector $a_2=(h_2,s_2,b_2)$ of the HSB color space based on a formula (3), a formula (4), and a formula (5).

$$b_k = \max(V_{kr}, V_{kg}, V_{kb}) \quad \text{formula (3)}$$

$$s_k = \begin{cases} \dfrac{b_k - \min(V_{kr}, V_{kg}, V_{kb})}{b_k} & \text{when } b_k \neq 0 \\ 0 & \text{when } b_k = 0 \end{cases} \quad \text{formula (4)}$$

$$h_k = \begin{cases} 60(V_{kg} - V_{kb})/(b_k - \min(V_{kr}, V_{kg}, V_{kb})) & \text{when } b_k = V_{kr} \\ 120 + 60(V_{kb} - V_{kr})/(b_k - \min(V_{kr}, V_{kg}, V_{kb})) & \text{when } b_k = V_{kg} \\ 240 + 60(V_{kb} - V_{kr})/(b_k - \min(V_{kr}, V_{kg}, V_{kb})) & \text{when } b_k = V_{kb} \end{cases} \quad \text{formula (5)}$$

where $k = 1$ or $2$,

T2 may specifically include:

separately determining, by the terminal, $V_{1r}$, $V_{1g}$, and $V_{1b}$ in the vector $V_1=(V_{1r},V_{1g},V_{1b})$ of the RGB color space of the rectangular area $R_1$, and $V_{2r}$, $V_{2g}$, and $V_{2b}$ in the RGB vector $V_2=(V_{2r},V_{2g},V_{2b})$ of the RGB color space of the rectangular area $R_2$ in the following manners S1 to S4; and determining, by the terminal, the vector $V_1=(V_{1r},V_{1g},V_{1b})$ of the RGB color space of the rectangular area $R_1$ based on the determined $V_{1r}$, $V_{1g}$, and $V_{1b}$, and determining, by the terminal, the vector $V_2=(V_{2r},V_{2g},V_{2b})$ of the RGB color space of the rectangular area $R_2$ based on the determined $V_{2r}$, $V_{2g}$, and $V_{2b}$.

S1 to S4 include:

S1: The terminal determines a histogram $H_{ki}$ of an i channel in an RGB color space of a rectangular area $R_k$, where k=1 or 2, and i=r, or g, or b.

S2: The terminal obtains a grayscale $G_{ki}$ having a largest probability in the histogram $H_{ki}$.

S3: The terminal determines, by using $G_{ki}$ as a center with reference to a formula (1), a sum $S_{ki}$ of probabilities of all grayscales between two grayscales having a same distance to $G_{ki}$, until $S_{ki}>T_{ki}$.

$T_{ki}$ is a preset rational number having a value range of 0 to 1.

max indicates obtaining a maximum value for all variables, and min indicates obtaining a minimum value for all the variables.

Figure 8:
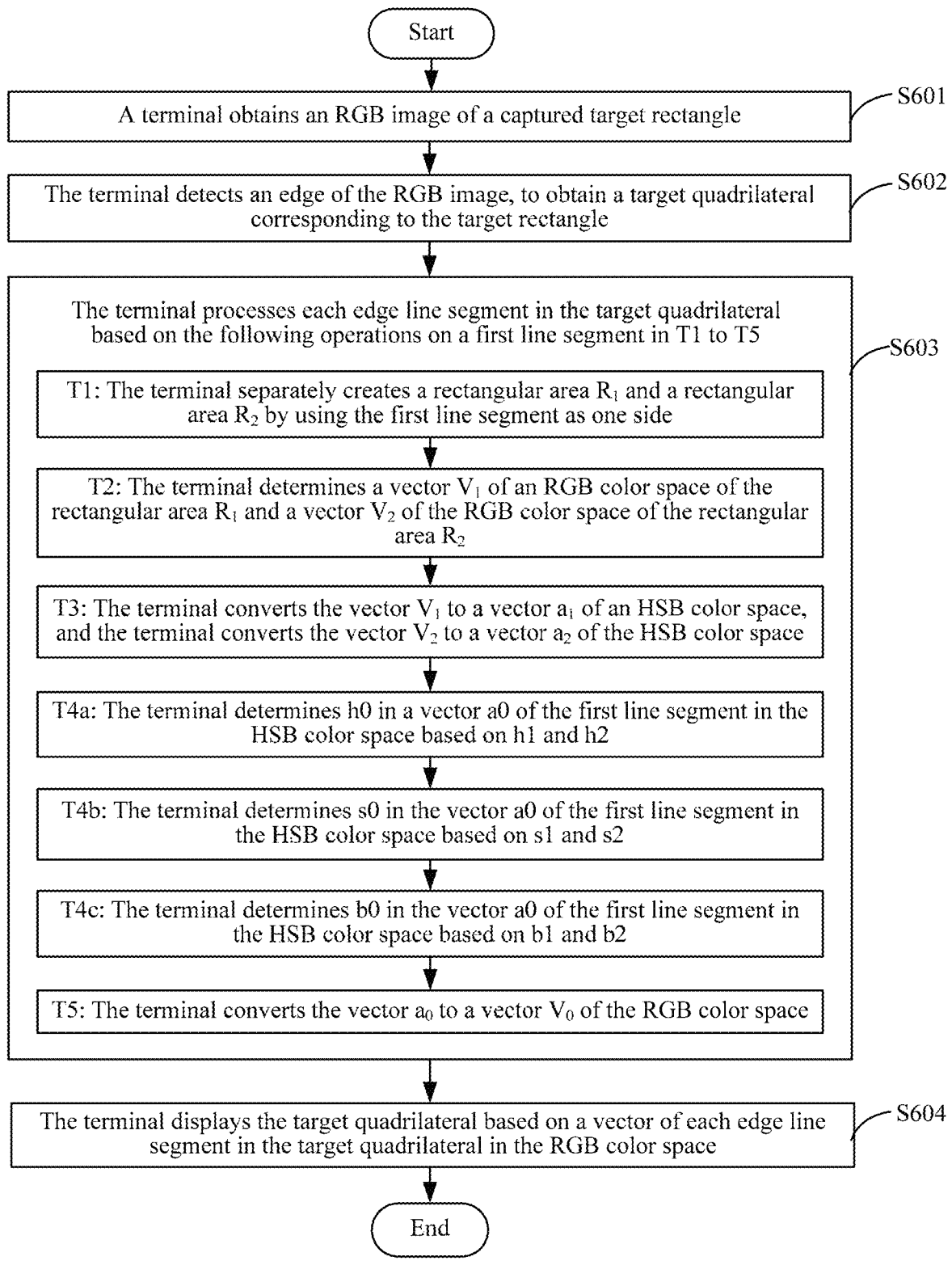
FIG. 8 is a flowchart of another method for displaying an edge of a rectangular frame according to an embodiment of the present invention.

As shown in FIG. 8, T4 may specifically include step T4a to step T4c.

T4a: The terminal determines $h_0$ in the vector $a_0=(h_0,s_0,b_0)$ of the first line segment in the HSB color space based on $h_1$ and $h_2$.

T4b: The terminal determines $s_0$ in the vector $a_0=(h_0,s_0,b_0)$ of the first line segment in the HSB color space based on $s_1$ and $s_2$.

T4c: The terminal determines $b_0$ in the vector $a_0=(h_0,s_0,b_0)$ of the first line segment in the HSB color space based on $b_1$ and $b_2$.

Figure 9:
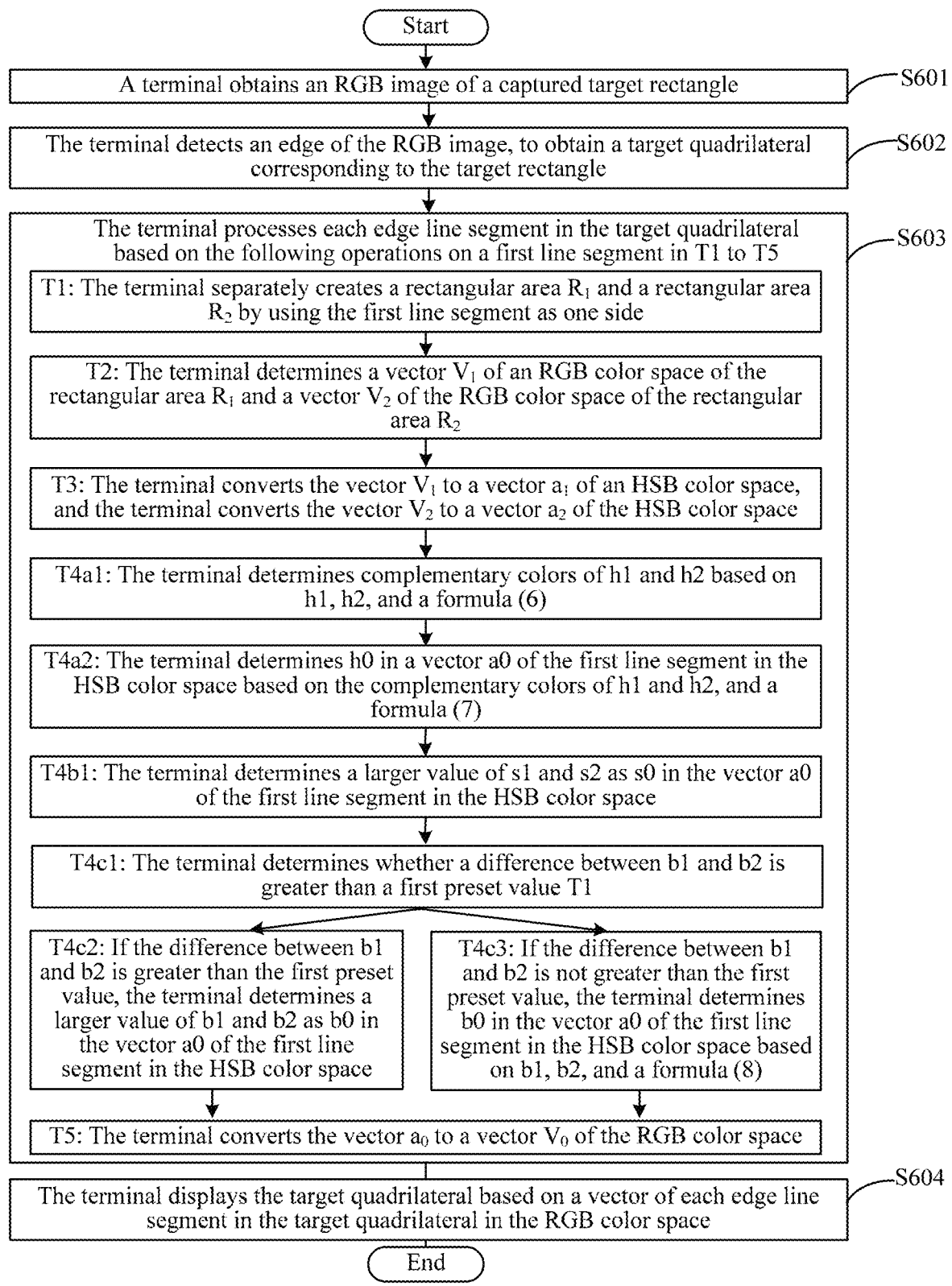
FIG. 9 is a flowchart of another method for displaying an edge of a rectangular frame according to an embodiment of the present invention.

In a possible implementation, as shown in FIG. 9, step T4a specifically includes step T4a1 and step T4a2:

T4a1: The terminal determines a complementary color of $h_1$ and a complementary color of $h_2$ based on $h_1$, $h_2$, and a formula (6).

$$\begin{cases} h_{1c} = h_1 + 180 \\ h_{2c} = h_2 + 180 \end{cases} \quad \text{formula (6)}$$

where $h_{1c}$ indicates the complementary color of $h_1$, and $h_{2c}$ indicates the complementary color of $h_2$.

T4a2: The terminal determines $h_0$ in the vector $a_0=(h_0, s_0, b_0)$ of the first line segment in the HSB color space based on the complementary color of $h_1$, the complementary color of $h_2$, and a formula (7).

$$h_0 = \begin{cases} \dfrac{h_{1c} + h_{2c}}{2} & \text{when } \dfrac{h_{1c} + h_{2c}}{2} < 360 \\ \dfrac{h_{1c} + h_{2c}}{2} - 360 & \text{when } \dfrac{h_{1c} + h_{2c}}{2} \geq 360 \end{cases} \quad \text{formula (7)}$$

The formula (6) is obtained based on a principle that two hues that are in a 24-color color circle and that are different from each other by 180 degrees are complementary colors of each other. Because a hue combined with a complementary color is a hue having highest contrast, and can produce visual simulation for a human, when $h_0$ is determined by using the foregoing manner, contrast between a border color and colors of areas at two sides of a border can be better improved, and user experience can be improved.

In a possible implementation, as shown in FIG. 9, step T4b may specifically include step T4b1.

T4b1: The terminal determines the larger one of $s_1$ and $s_2$ as $s_0$ in the vector $a_0=(h_0,s_0,b_0)$ of the first line segment in the HSB color space.

A larger value of $s_0$ indicates higher saturation and a brighter color. After $h_0$ of an H channel is determined, higher saturation is required, so that a color of a division line looks brighter. Therefore, the larger one of $s_1$ and $s_2$ is selected as $s_0$.

In a possible implementation, as shown in FIG. 9, step T4c may specifically include step T4c1 to step T4c3.

T4c1: The terminal determines whether a difference between $b_1$ and $b_2$ is greater than a first preset value $T_1$, where $T_1 \in [0,1]$.

T4c2: If the difference between $b_1$ and $b_2$ is greater than the first preset value, the terminal determines the larger one of $b_1$ and $b_2$ as $b_0$ in the vector $a_0=(h_0,s_0,b_0)$ of the first line segment in the HSB color space.

When the difference between $b_1$ and $b_2$ is greater than the first preset value, it indicates that there is a relatively large difference between brightness of areas at two sides of the division line. Therefore, when a color of the H channel can be used to distinguish between the division line and the areas at the two sides of the division line, a b value may be made as large as possible, to make the color of the division line brighter.

T4c3: If the difference between $b_1$ and $b_2$ is not greater than the first preset value, the terminal determines $b_0$ in the vector $a_0=(h_0,s_0,b_0)$ of the first line segment in the HSB color space based on $b_1$, $b_2$, and a formula (8).

$$b_0 = \begin{cases} \dfrac{b_1 + b_2}{2} + T_2 & \text{when } \dfrac{b_1 + b_2}{2} + T_2 \leq 1 \\ \dfrac{b_1 + b_2}{2} + T_2 - 1.0 & \text{when } \dfrac{b_1 + b_2}{2} + T_2 > 1 \end{cases} \quad \text{formula (8)}$$

$$T_2 \in [0, 1] \text{ and } T_2 \geq \dfrac{T_1}{2}$$

When the difference between $b_1$ and $b_2$ is not greater than the first preset value, it indicates that there is a small difference between brightness of areas at two sides of the division line. Therefore, a b value having a relatively large difference from brightness of both the areas at the two sides is required, to distinguish between the division line and the areas at the two sides of the division line.

Based on the embodiment shown in FIG. 9, when a color contrast problem in the prior art is considered, a complementary color of an H channel related to a color circle is mainly considered, but in this embodiment of the present invention, when the color contrast problem is considered, the complementary color of the H channel and impact of an S channel and a B channel are both considered, and contrast between an edge line segment in a rectangular frame and two areas adjacent to the edge line segment is considered. Therefore, more comprehensive consideration is achieved, so that contrast between a border color and colors of areas at two sides of a border is higher.

T5 may specifically include:

converting, by the terminal, the vector $a_0$ to the vector $V_0=(V_{0r},V_{0g},V_{0b})$ of the RGB color space based on the following formula (9) to formula (14).

$$h_m = \left\lfloor \dfrac{h_0}{60} \right\rfloor \bmod 6 \quad \text{formula (9)}$$

where $$\left\lfloor \dfrac{h_0}{60} \right\rfloor \bmod 6$$

indicates obtaining a remainder of division of a largest integer less than $$\dfrac{h_0}{60}$$

by 6;

$$f = \dfrac{h_0}{60} - h_m \quad \text{formula (10)}$$

$$p = b_0 * (1 - s_0) \quad \text{formula (11)}$$

$$q = b_0 * (1 - f * s_0) \quad \text{formula (12)}$$

$$t = b_0 * (1 - (1 - f) * s_0) \quad \text{formula (13)}$$

$$(V_{0r}, V_{0g}, V_{0b}) = \begin{cases} (b_0, t, p), h_m = 0 \\ (q, b_0, p), h_m = 1 \\ (p, b_0, t), h_m = 2 \\ (p, q, b_0), h_m = 3 \\ (t, p, b_0), h_m = 4 \\ (b_0, p, q), h_m = 5 \end{cases} \quad \text{formula (14)}$$

In a possible implementation, step S604 may specifically include:

displaying, by the terminal, each edge line segment in the target quadrilateral based on the vector of each edge line segment in the target quadrilateral in the RGB color space.

Alternatively, optionally, in a possible implementation, step S604 may specifically include:

calculating, by the terminal based on a formula (15) and a value of an H channel in a vector of each edge line segment in the target quadrilateral in the HSB color space, a Δh value corresponding to each edge line segment in the target quadrilateral; and displaying, by the terminal, each edge line segment in the target quadrilateral based on a vector that is of an edge line segment corresponding to a smallest value Δh in the four Δh values corresponding to the four edge line segments in the target quadrilateral and that is in the RGB color space.

$$\Delta h = |h_1 - h_2| \quad \text{formula (15)}$$

In conclusion, based on the method for displaying an edge of a rectangular frame provided in this embodiment of the present invention, when the terminal performs a preview during photographing or corrects a rectangular image in a captured picture, if colors of areas at two sides of a border are both warm colors or cool colors, the terminal can adaptively determine a border color, and generate a border color having better contrast with the colors of the areas at the two sides of the border, thereby improving the contrast between the border color and the colors of the areas at the two sides of the border, and improving user experience.

Figures 10, 11:
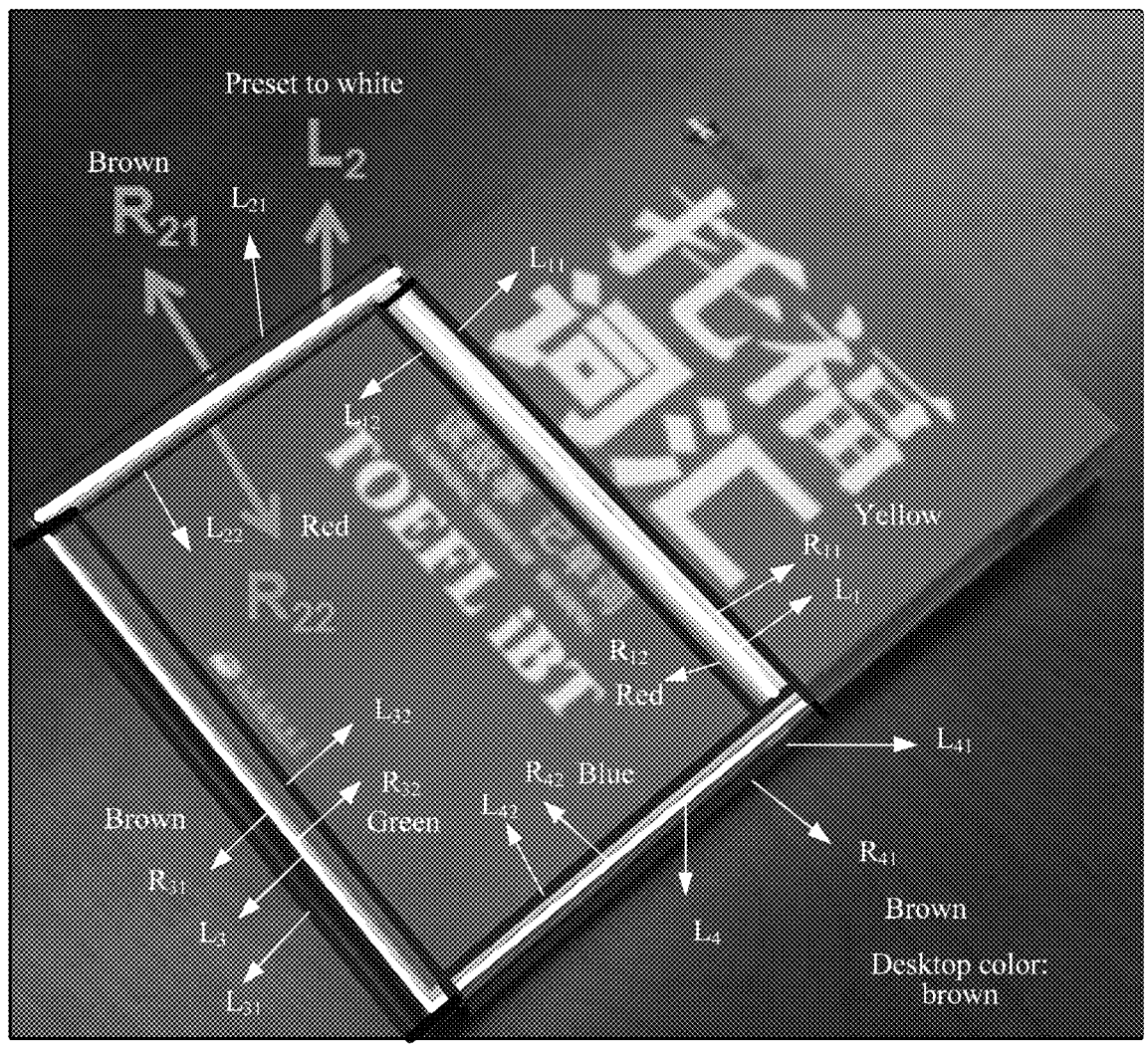
FIG. 10 is a schematic diagram of determining a color of an edge line segment of a rectangular frame according to an embodiment of the present invention.
FIG. 11 is a possible schematic structural diagram of a terminal according to an embodiment of the present invention.

For example, as shown in FIG. 10, it is assumed that $L_1$ is an upper edge line segment in the target quadrilateral corresponding to the target rectangle, the terminal creates two rectangular areas that are respectively $R_{11}$ and $R_{12}$ by using $L_{11}$ as one side, and each of a line segment $L_{11}$ and a line segment $L_{12}$ parallel to and having a same distance to $L_1$ as another side. A color of the area $R_{11}$ is yellow, a color of the area $R_{12}$ is red, and it may be learned that, yellow and red are both warm colors. If a border color that is set by a device is a warm color, contrast between the border color and the color of the rectangular area $R_{11}$ and the color of the rectangular area $R_{12}$ is low. Therefore, the following processing may be performed on the edge line segment according to the method for displaying an edge of a rectangular frame provided in the foregoing embodiment.

First step: The terminal determines a vector $V_1=(V_{1r},V_{1g},V_{1b})$ of an RGB color space of the rectangular area $R_{11}$ and a vector $V_2=(V_{2r},V_{2g},V_{2b})$ of the RGB color space of the rectangular area $R_{12}$.

Specifically, the terminal may obtain, based on the foregoing formula (1) and formula (2), that the vector $V_1=(V_{1r},V_{1g},V_{1b})$ of the RGB color space of the area $R_{11}$ (the yellow area)=(226, 201, 10), and the vector $V_2=(V_{2r},V_{2g},V_{2b})$ of the RGB color space of the area $R_{12}$ (the red area)=(216, 67, 7).

Second step: The terminal converts the vector $V_1$ to a vector $a_1=(h_1,s_1,b_1)$ of an HSB color space, and the terminal converts the vector $V_2$ to a vector $a_2=(h_2,s_2,b_2)$ of the HSB color space.

Specifically, it may be obtained, based on the formula (3), the formula (4), and the formula (5), that the vector $a_1=(h_1,s_1,b_1)$ of the HSB color space corresponding to the area $R_{11}$ (the yellow area)=(53, 0.96, 0.89), and the vector $a_2=(h_2,s_2,b_2)$ of the HSB color space corresponding to the area $R_{12}$ (the red area)=(17, 0.97, 0.85).

Third step: The terminal determines a vector $a_0=(h_0,s_0,b_0)$ of the line segment $L_1$ in the HSB color space based on the vector $a_1$ and the vector $a_2$.

Specifically, complementary colors $h_{1c}=53+180=233$ and $h_{2c}=17+180=197$ may be calculated based on the formula (6), and $$h_0 = \frac{h_{1c} + h_{2c}}{2} = \frac{233 + 197}{2} = 215$$

is calculated based on the formula (7).

The larger one of $s_1$ and $s_2$ is used as $s_0$ and is 0.97.

When $b_0$ is calculated, assuming that a threshold $T_1$ is 0.3 and a threshold $T_2$ is 0.5, $$b_0 = \frac{b_1 + b_2}{2} + T_2 - 1.0 = \frac{0.89 + 0.85}{2} + 0.5 - 1.0 = 0.37$$

is calculated based on the formula (8).

Fourth step: The terminal converts the vector $a_0$ to a vector $V_0=(V_{0r},V_{0g},V_{0b})$ of the RGB color space.

Specifically, it may be calculated, based on the formula (9) to the formula (14), that the line segment $L_1$ has an RGB value being (3, 41, 94) and corresponds to dark blue in the RGB color space.

A list of vectors of red, yellow, and blue in the RGB color space and vectors of red, yellow, and blue in the HSB color space is shown in Table 1.

TABLE 1

|  | $R_{11}$ (yellow) | $R_{12}$ (red) | $L_1$ (dark blue) |
| --- | --- | --- | --- |
| (R, G, B) | (226, 201, 10) | (216, 67, 7) | (3, 41, 94) |
| (H, S, B) | (53, 0.96, 0.89) | (17, 0.97, 0.85) | (215, 0.97, 0.37) |

Similarly, as shown in FIG. 10, it is assumed that $L_2$ is a left edge line segment in the target quadrilateral corresponding to the target rectangle, the terminal creates a rectangular area $R_{21}$ and a rectangular area $R_{22}$ by using $L_{21}$ as one side, and each of a line segment $L_{21}$ and a line segment $L_{22}$ parallel to and having a same distance to $L_2$ as another side. A color of the area $R_{21}$ is brown, a color of the area $R_{22}$ is red, and it may be learned that, brown and red are both warm colors. If a border color that is set by a device is also a warm color, contrast between the border color and the color of the rectangular area $R_{21}$ and the color of the rectangular area $R_{22}$ may be low. Therefore, similarly, the foregoing processing may be performed on the edge line segment according to the method for displaying an edge of a rectangular frame provided in the foregoing embodiment. For details, refer to a processing manner on the upper edge line segment $L_1$ in the target quadrilateral, and details are not described again.

A list of vectors of brown, red, and light blue in the RGB color space and vectors of brown, red, and light blue in the HSB color space is shown in Table 2.

TABLE 2

|  | $R_{21}$ (brown) | $R_{22}$ (red) | $L_2$ (light blue) |
| --- | --- | --- | --- |
| (R, G, B) | (115, 49, 17) | (216, 61, 7) | (7, 154, 217) |
| (H, S, B) | (20, 0.85, 0.45) | (16, 0.97, 0.85) | (198, 0.97, 0.85) |

Similarly, as shown in FIG. 10, it is assumed that $L_3$ is a lower edge line segment in the target quadrilateral corresponding to the target rectangle, the terminal creates a rectangular area $R_{31}$ and a rectangular area $R_{32}$ by using $L_{31}$ as one side, and each of a line segment $L_{31}$ and a line segment $L_{32}$ parallel to and having a same distance to $L_3$ as another side. A color of the area $R_{32}$ is brown, a color of the area $R_{32}$ is green, and similarly, the foregoing processing may be performed on the edge line segment according to the method for displaying an edge of a rectangular frame provided in the foregoing embodiment. For details, refer to a processing manner on the upper edge line segment $L_1$ in the target quadrilateral, and details are not described again.

A list of vectors of brown, green, and purple in the RGB color space and vectors of brown, green, and purple in the HSB color space is shown in Table 3.

TABLE 3

|  | $R_{31}$ (brown) | $R_{32}$ (green) | $L_3$ (purple) |
| --- | --- | --- | --- |
| (R, G, B) | (115, 49, 17) | (18, 84, 23) | (76, 34, 227) |
| (H, S, B) | (20, 0.85, 0.45) | (125, 0.79, 0.33) | (253, 0.85, 0.89) |

Similarly, as shown in FIG. 10, it is assumed that $L_4$ is a right edge line segment in the target quadrilateral corresponding to the target rectangle, the terminal creates a rectangular area $R_{41}$ and a rectangular area $R_{42}$ by using $L_{41}$ as one side, and each of a line segment $L_{41}$ and a line segment $L_{42}$ parallel to and having a same distance to $L_4$ as another side. A color of the area $R_{41}$ is brown, a color of the area $R_{42}$ is green, and similarly, the foregoing processing may be performed on the edge line segment according to the method for displaying an edge of a rectangular frame provided in the foregoing embodiment. For details, refer to a processing manner on the upper edge line segment $L_1$ in the target quadrilateral, and details are not described again.

A list of vectors of brown, blue, and purple in the RGB color space and vectors of brown, blue, and purple in the HSB color space is shown in Table 4.

TABLE 4

|  | $R_{41}$ (brown) | $R_{42}$ (blue) | $L_4$ (purple) |
| --- | --- | --- | --- |
| (R, G, B) | (115, 49, 17) | (40, 52, 212) | (212, 32, 188) |
| (H, S, B) | (20, 0.85, 0.45) | (236, 0.81, 0.83) | (308, 0.85, 0.83) |

After respectively determining the vectors of the line segment $L_1$, the line segment $L_2$, the line segment $L_3$, and the line segment $L_4$ in the RGB color space, the terminal may display, based on the corresponding vectors of the line segment $L_1$, the line segment $L_2$, the line segment $L_3$, and the line segment $L_4$ in the RGB color space, colors of the line segment $L_1$, the line segment $L_2$, the line segment $L_3$, and the line segment $L_4$ that are respectively dark blue in Table 1, light blue in Table 2, purple in Table 3, and purple in Table 4.

Optionally, the terminal may select, according to a particular rule, a color of one of the line segments as a color of four sides of the target quadrilateral, to display the four sides of the target quadrilateral. For example, it is considered that a smaller Δh indicates closer colors of areas at two sides, and therefore, a border having higher contrast is required for distinguishing. Therefore, the rule may be that: the terminal calculates, based on the formula (15) and the value of the H channel in the vector of each edge line segment in the target quadrilateral in the HSB color space, the Δh value corresponding to each edge line segment in the target quadrilateral; and the terminal displays each edge line segment in the target quadrilateral based on the vector that is of the edge line segment corresponding to the smallest Δh value in the four Δh values corresponding to the four edge line segments in the target quadrilateral and that is in the RGB color space.

For example, following the foregoing example, after respectively determining the vectors of the line segment $L_1$, the line segment $L_2$, the line segment $L_3$, and the line segment $L_4$ in the RGB color space, the terminal may respectively calculate, based on the formula (15) and the values of the H channels in Table 1 to Table 4, the Δh values corresponding to the four line segments, as shown in Table 5.

TABLE 5

|  | $L_1$ | $L_2$ | $L_3$ | $L_4$ |
| --- | --- | --- | --- | --- |
| Δh | 36 | 4 | 105 | 216 |

Further, the terminal may display, based on that the vector $V_0$ that is of the line segment $L_2$ corresponding to the smallest value $\Delta h_2=4$ in $\Delta h_1$, $\Delta h_2$, $\Delta h_3$, and $\Delta h_4$ and that is in the RGB color space=(7, 154, 217), the colors of the line segment $L_1$, the line segment $L_2$, the line segment $L_3$, and the line segment $L_4$ that are all light blue corresponding to the vector $V_0$=(7, 154, 217).

Optionally, in this embodiment of the present invention, after the H channels in the vectors of all the line segments in the HSB color space are calculated, first, the Δh values corresponding to the four line segments are calculated, the line segment corresponding to the smallest value in $\Delta h_1$, $\Delta h_2$, $\Delta h_3$, and $\Delta h_4$ is selected, and values of an S channel and a B channel in the vector of the line segment in the HSB color space are calculated; then, the vector $V_0$ of the line segment in the RGB color space is calculated based on the vector of the line segment in the HSB color space; and finally, the color of the line segment is used as the color of the four edges to display the target quadrilateral. For a specific calculation manner, refer to the processing manner in the foregoing embodiment, and details are not described again.

It may be learned from the foregoing two examples that, based on the method for displaying an edge of a rectangular frame provided in this embodiment of the present invention, when the terminal performs a preview during photographing or corrects a rectangular image in a captured picture, if colors of areas at two sides of a border are both warm colors or cool colors, the terminal can adaptively determine a border color, and generate a border color having better contrast with the colors of the areas at the two sides of the border, thereby improving the contrast between the border color and the colors of the areas at the two sides of the border, and improving user experience.

In the embodiments of the present invention, functional modules of the terminal may be divided based on the foregoing examples in the method, for example, the functional modules may be divided for various corresponding functions, or two or more modules may be integrated in a processing module. The integrated module may be implemented in a form of hardware, or may be implemented in a form of a software functional module. It should be noted that, in the embodiments of the present invention, the module division is an example and is merely logical function division and may be other division in actual implementation.

When an integrated unit is used, FIG. 11 is a possible schematic structural diagram of a terminal according to an embodiment of the present invention. The terminal 1100 includes a camera module 1101, a processing module 1102, and a display module 1103. The camera module 101 is configured to obtain an RGB image of a captured target rectangle. The processing module 1102 is configured to process a border of the rectangle. The display module 1103 is configured to display a target border color of the target rectangle. For example, the camera module 1101 is configured to support performing S601 in FIG. 6, S601 in FIG. 8, and S601 in FIG. 9 by the terminal. The display module 1103 is configured to support performing S604 in FIG. 6, S604 in FIG. 8, and S604 in FIG. 9 by the terminal. The processing module 1102 is configured to support performing, by the terminal, all steps of S602 and S603 in FIG. 6, FIG. 8, and FIG. 9, and/or other processes applied to technologies described in this specification.

The camera module 1101 may be a camera such as a front-facing camera or a rear-facing camera.

The processing module 1102 may be a processor or a controller, for example, may be a central processing unit (English: central processing unit, CPU for short), a general-purpose processor, a digital signal processor (English: digital signal processor, DSP for short), an application-specific integrated circuit (English: application-specific integrated circuit, ASIC for short), a field programmable gate array (English: field programmable gate array, FPGA for short), or another programmable logical device, a transistor logical device, a hardware component, or any combination thereof. The controller/processor can implement or perform various examples of logic blocks, modules, and circuits described with reference to content disclosed in the present invention. The processor may also be a combination that implements a calculation function, for example, including one microprocessor or a combination of a plurality of microprocessors, or a combination of a DSP and a microprocessor.

When the camera module 1101 is a camera, the processing module 1102 is a processor, and the display module 1103 is a display screen, the terminal in this embodiment of the present invention may be the terminal shown in FIG. 5.

Method or algorithm steps described with reference to the content disclosed in the present invention may be implemented by hardware, or may be implemented by a processor by executing a software instruction. The software instruction may be formed by a corresponding software module. The software module may be stored in a random access memory (English: random access memory, RAM for short), a flash memory, a read-only memory (English: read only memory, ROM for short), an erasable programmable read-only memory (English: erasable programmable ROM, EPROM for short), an electrically erasable programmable read-only memory (English: electrically EPROM, EEPROM for short), a register, a hard disk, a removable hard disk, a compact disc read-only memory (English: compact disc ROM, CD-ROM for short), or a storage medium in any other form well-known in the art. For example, a storage medium is coupled to the processor, so that the processor can read information from the storage medium or write information into the storage medium. Certainly, the storage medium may be a component of the processor. The processor and the memory medium may be located in the terminal.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method for displaying an edge of a rectangular frame, wherein the method comprises:

obtaining, by a terminal, a red green blue RGB image of a captured target rectangle;

detecting, by the terminal, an edge of the RGB image, to obtain a target quadrilateral corresponding to the target rectangle;

processing, by the terminal, each edge line segment in the target quadrilateral based on the following operations on a first line segment:

separately creating, by the terminal, a rectangular area $R_1$ and a rectangular area $R_2$ by using the first line segment as one side;

determining, by the terminal, a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$;

converting, by the terminal, the vector $V_1$ to a vector $a_1=(h_1,s_1,b_1)$ of a hue saturation brightness HSB color space, and converting, by the terminal, the vector $V_2$ to a vector $a_2=(h_2,s_2,b_2)$ of the HSB color space;

determining, by the terminal, a vector $a_0=(h_0,s_0,b_0)$ of the first line segment in the HSB color space based on the vector $a_1$ and the vector $a_2$; and converting, by the terminal, the vector $a_0$ to a vector $V_0=(V_{0r},V_{0g},V_{0b})$ of the RGB color space; and after the terminal processes each edge line segment in the target quadrilateral based on the foregoing operations on the first line segment, displaying, by the terminal, the target quadrilateral based on a vector of each edge line segment in the target quadrilateral in the RGB color space.

2. The method according to claim 1, wherein the determining, by the terminal, a vector $a_0=(h_0,s_0,b_0)$ of the first line segment in the HSB color space based on the vector $a_1$ and the vector $a_2$ comprises:

determining, by the terminal, $h_0$ in the vector $a_0=(h_0,s_0,b_0)$ of the first line segment in the HSB color space based on $h_1$ and $h_2$;

determining, by the terminal, $s_0$ in the vector $a_0=(h_0,s_0,b_0)$ of the first line segment in the HSB color space based on $S_1$ and $s_2$; and determining, by the terminal, $b_0$ in the vector $a_0=(h_0,s_0,b_0)$ of the first line segment in the HSB color space based on $b_1$ and $b_2$.

3. The method according to claim 2, wherein the determining, by the terminal, $h_0$ in the vector $a_0=(h_0,s_0,b_0)$ of the first line segment in the HSB color space based on $h_1$ and $h_2$ comprises:
  determining, by the terminal, a complementary color of $h_1$ and a complementary color of $h_2$ based on $h_1$, $h_2$, and the following first preset formula; and
  determining, by the terminal, $h_0$ in the vector $a_0=(h_0,s_0,b_0)$ of the first line segment in the HSB color space based on the complementary color of $h_1$, the complementary color of $h_2$, and the following second preset formula, wherein
  the first preset formula comprises:

$$\begin{cases} h_{1c} = h_1 + 180 \\ h_{2c} = h_2 + 180 \end{cases},$$

wherein $h_{1c}$ indicates the complementary color of $h_1$, and $h_{2c}$ indicates the complementary color of $h_2$; and
the second preset formula comprises:

$$h_0 = \begin{cases} \dfrac{h_{1c}+h_{2c}}{2} & \text{when } \dfrac{h_{1c}+h_{2c}}{2} < 360 \\ \dfrac{h_{1c}+h_{2c}}{2} - 360 & \text{when } \dfrac{h_{1c}+h_{2c}}{2} \geq 360 \end{cases}.$$

4. The method according to claim 2, wherein the determining, by the terminal, $s_0$ in the vector $a_0=(h_0,s_0,b_0)$ of the first line segment in the HSB color space based on $s_1$ and $s_2$ comprises:
  determining, by the terminal, the larger one of $s_1$ and $s_2$ as $s_0$ in the vector $a_0=(h_0,s_0,b_0)$ of the first line segment in the HSB color space.

5. The method according to claim 2, wherein the determining, by the terminal, $b_0$ in the vector $a_0=(h_0,s_0,b_0)$ of the first line segment in the HSB color space based on $b_1$ and $b_2$ comprises:
  determining, by the terminal, whether a difference between $b_1$ and $b_2$ is greater than a first preset value $T_1$, wherein $T_1 \in [0,1]$; and
  if the difference between $b_1$ and $b_2$ is greater than the first preset value, determining, by the terminal, the larger one of $b_1$ and $b_2$ as $b_0$ in the vector $a_0=(h_0,s_0,b_0)$ of the first line segment in the HSB color space; or
  if the difference between $b_1$ and $b_2$ is not greater than the first preset value, determining, by the terminal, $b_0$ in the vector $a_0=(h_0,s_0,b_0)$ of the first line segment in the HSB color space based on $b_1$, $b_2$, and the following third preset formula, wherein
  the third preset formula comprises:

$$b_0 = \begin{cases} \dfrac{b_1+b_2}{2} + T_2 & \text{when } \dfrac{b_1+b_2}{2} + T_2 \leq 1 \\ \dfrac{b_1+b_2}{2} + T_2 - 1.0 & \text{when } \dfrac{b_1+b_2}{2} + T_2 > 1 \end{cases},$$

$T_2 \in [0,1]$ and $T_2 \geq \dfrac{T_1}{2}$.

6. The method according to claim 1, wherein the determining, by the terminal, a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$ comprises:
  separately determining, by the terminal, $V_{1r}$, $V_{1g}$, and $V_{1b}$ in the vector $V_1=(V_{1r},V_{1g},V_{1b})$ of the RGB color space of the rectangular area $R_1$, and $V_{2r}$, $V_{2g}$, and $V_{2b}$ in the vector $V_2=(V_{2r},V_{2g},V_{2b})$ of the RGB color space of the rectangular area $R_2$ in the following manners S1 to S4:
  S1: determining, by the terminal, a histogram $H_{ki}$ of an i channel in an RGB color space of a rectangular area $R_k$, wherein k=1 or 2, and i=r, or g, or b;
  S2: obtaining, by the terminal, a grayscale $G_{ki}$ having a largest probability in the histogram $H_{ki}$;
  S3: determining, by the terminal by using $G_{ki}$ as a center with reference to the following fourth preset formula, a sum $S_{ki}$ of probabilities of all grayscales between two grayscales having a same distance to $G_{ki}$, until $S_{ki} > T_{ki}$, wherein $T_{ki}$ is a preset rational number having a value range of 0 to 1; and
  S4: determining, by the terminal, $V_{ki}$ in an RGB vector $V_k$ of the RGB color space of the rectangular area $R_k$ based on $S_{ki}$ and the following fifth preset formula; and
  determining, by the terminal, the vector $V_1=(V_{1r},V_{1g},V_{1b})$ of the RGB color space of the rectangular area $R_1$ based on $V_{1r}$, $V_{1g}$, and $V_{1b}$, and determining, by the terminal, the vector $V_2=(V_{2r},V_{2g},V_{2b})$ of the RGB color space of the rectangular area $R_2$ based on $V_{2r}$, $V_{2g}$, and $V_{2b}$, wherein
  the fourth preset formula comprises:

$$S_{ki} = \sum_{g_{k1}}^{g_{k2}} H_{ki}(x)$$

$x \in [g_{k1}, g_{k2}]$, wherein $G_{ki} - g_{k1} = g_{k2} - G_{ki}$;

and
the fifth preset formula comprises:

$$V_{ki} = \sum_{g_{k1}}^{g_{k2}} x * H'_{ki}(x) \; x \in [g_{k1}, g_{k2}], \text{ where } H'_{ki}(x) = \dfrac{H_{ki}(x)}{S_{ki}},$$

wherein $H_{ki}(x)$ indicates a probability value of a grayscale having a grayscale of x in an i channel in a grayscale histogram of a $k^{th}$ area, $H'_{ki}(x)$ indicates normalization for $H_{ki}(x)$, and $\Sigma$ indicates obtaining a sum of all values in a range.

7. The method according to claim 1, wherein the converting, by the terminal, the vector $V_1$ to a vector $a_1=(h_1,s_1,b_1)$ of an HSB color space, and converting, by the terminal, the vector $V_2$ to a vector $a_2=(h_2,s_2,b_2)$ of the HSB color space comprises:
  converting, by the terminal, the vector $V_1$ to the vector $a_1=(h_1,s_1,b_1)$ of the HSB color space, and converting the vector $V_2$ to the vector $a_2=(h_2,s_2,b_2)$ of the HSB color space based on the following sixth preset formula, seventh preset formula, and eighth preset formula, wherein
  the sixth preset formula comprises: $b_k = \max(V_{kr}, V_{kg}, V_{kb})$;
  the seventh preset formula comprises:

$$s_k = \begin{cases} \dfrac{b_k - \min(V_{kr}, V_{kg}, V_{kb})}{b_k} & \text{when } b_k \neq 0 \\ 0 & \text{when } b_k = 0 \end{cases};$$

and
the eighth preset formula comprises:

$$h_k = \begin{cases} 60(V_{kg} - V_{kb})/(b_k - \min(V_{kr}, V_{kg}, V_{kb})) & \text{when } b_k = V_{kr} \\ 120 + 60(V_{kb} - V_{kr})/(b_k - \min(V_{kr}, V_{kg}, V_{kb})) & \text{when } b_k = V_{kg} \\ 240 + 60(V_{kr} - V_{kg})/(b_k - \min(V_{kr}, V_{kg}, V_{kb})) & \text{when } b_k = V_{kb} \end{cases}$$

wherein k=1 or 2, max indicates obtaining a maximum value for all variables, and min indicates obtaining a minimum value for all the variables.

8. The method according to claim 1, wherein
the converting, by the terminal, the vector $a_0$ to a vector $V_0=(V_{0r},V_{0g},V_{0b})$ of the RGB color space comprises:
converting, by the terminal, the vector $a_0$ to the vector $V_0=(V_{0r},V_{0g},V_{0b})$ of the RGB color space based on the following ninth preset formula to fourteenth preset formula, wherein
the ninth preset formula comprises:

$$h_m = \left\lfloor \frac{h_0}{60} \right\rfloor \bmod 6,$$

wherein $$\left\lfloor \frac{h_0}{60} \right\rfloor \bmod 6$$

indicates obtaining a remainder of division of a largest integer less than $$\frac{h_0}{60}$$

by 6;
the tenth preset formula comprises:

$$f = \frac{h_0}{60} - h_m;$$

the eleventh preset formula comprises: $p=b_0*(1-s_0)$;
the twelfth preset formula comprises: $q=b_0*(1-f*s_0)$;
the thirteenth preset formula comprises: $t=b*(1-(1-f)*s_0)$; and
the fourteenth preset formula comprises:

$$(V_{0r}, V_{0g}, V_{0b}) = \begin{cases} (b_0, t, p), & h_m = 0 \\ (q, b_0, p), & h_m = 1 \\ (p, b_0, t), & h_m = 2 \\ (p, q, b_0), & h_m = 3 \\ (t, p, b_0), & h_m = 4 \\ (b_0, p, q), & h_m = 5 \end{cases}.$$

9. The method according to claim 1, wherein the displaying, by the terminal, the target quadrilateral based on a vector of each edge line segment in the target quadrilateral in the RGB color space comprises:
displaying, by the terminal, each edge line segment in the target quadrilateral based on the vector of each edge line segment in the target quadrilateral in the RGB color space.

10. The method according to claim 1, wherein the displaying, by the terminal, the target quadrilateral based on a vector of each edge line segment in the target quadrilateral in the RGB color space comprises:
calculating, by the terminal based on a fifteenth preset formula and a value of an H channel in a vector of each edge line segment in the target quadrilateral in the HSB color space, a Δh value corresponding to each edge line segment in the target quadrilateral; and
displaying, by the terminal, each edge line segment in the target quadrilateral based on a vector that is of an edge line segment corresponding to a smallest Δh value in the four Δh values corresponding to the four edge line segments in the target quadrilateral and that is in the RGB color space, wherein
the fifteenth preset formula comprises: $\Delta h=|h_1-h_2|$.

11. A terminal for displaying an edge of a rectangle, wherein the terminal comprises a camera, a processor, and a display screen, wherein
the camera is configured to obtain a red green blue RGB image of a captured target rectangle;
the processor is configured to detect an edge of the RGB image, to obtain a target quadrilateral corresponding to the target rectangle;
the processor is further configured to process each edge line segment in the target quadrilateral based on the following operations on a first line segment:
separately creating a rectangular area $R_1$ and a rectangular area $R_2$ by using the first line segment as one side;
determining a vector $V_1=(V_{1r},V_{1g},V_{1b})$ of an RGB color space of the rectangular area $R_1$ and a vector $V_2=(V_{2r},V_{2g},V_{2b})$ of the RGB color space of the rectangular area $R_2$;
converting the vector $V_1$ to a vector $a_1=(h_1,s_1,b_1)$ of a hue saturation brightness HSB color space, and converting the vector $V_2$ to a vector $a_2=(h_2,s_2,b_2)$ of the HSB color space;
determining a vector $a_0=(h_0,s_0,b_0)$ of the first line segment in the HSB color space based on the vector $a_1$ and the vector $a_2$; and
converting the vector $a_0$ to a vector $V_0=(V_{0r},V_{0g},V_{0b})$ of the RGB color space; and
after the processor processes each edge line segment in the target quadrilateral based on the foregoing operations on the first line segment, the display screen displays the target quadrilateral based on a vector of each edge line segment in the target quadrilateral in the RGB color space.

12. The terminal according to claim 11, wherein the processor is specifically configured to:
determine $h_0$ in the vector $a_0=(h_0,s_0,b_0)$ of the first line segment in the HSB color space based on $h_1$ and $h_2$;
determine $s_0$ in the vector $a_0=(h_0,s_0,b_0)$ of the first line segment in the HSB color space based on $s_1$ and $s_2$; and
determine $b_0$ in the vector $a_0=(h_0,s_0,b_0)$ of the first line segment in the HSB color space based on $b_1$ and $b_2$.

13. The terminal according to claim 12, wherein the processor is specifically configured to:
determine a complementary color of $h_1$ and a complementary color of $h_2$ based on $h_1$, $h_2$ and the following first preset formula; and
determine $h_0$ in the vector $a_0=(h_0,s_0,b_0)$ of the first line segment in the HSB color space based on the complementary color of $h_1$, the complementary color of $h_2$, and the following second preset formula, wherein the first preset formula comprises:

$$\begin{cases} h_{1c} = h_1 + 180 \\ h_{2c} = h_2 + 180 \end{cases},$$

wherein $h_{1c}$ indicates the complementary color of $h_1$, and $h_{2c}$ indicates the complementary color of $h_2$; and the second preset formula comprises:

$$h_0 = \begin{cases} \dfrac{h_{1c} + h_{2c}}{2} & \text{when } \dfrac{h_{1c} + h_{2c}}{2} < 360 \\ \dfrac{h_{1c} + h_{2c}}{2} - 360 & \text{when } \dfrac{h_{1c} + h_{2c}}{2} \geq 360 \end{cases}.$$

14. The terminal according to claim 12, wherein the processor is specifically configured to:
determine the larger one of $s_1$ and $s_2$ as $s_0$ in the vector $a_0 = (h_0, s_0, b_0)$ of the first line segment in the HSB color space.

15. The terminal according to claim 12, wherein the processor is specifically configured to:
determine whether a difference between $b_1$ and $b_2$ is greater than a first preset value $T_1$, wherein $T_1 \in [0,1]$; and
if the difference between $b_1$ and $b_2$ is greater than the first preset value, determine the larger one of $b_1$ and $b_2$ as $b_0$ in the vector $a_0 = (h_0, s_0, b_0)$ of the first line segment in the HSB color space; or
if the difference between $b_1$ and $b_2$ is not greater than the first preset value, determine $b_0$ in the vector $a_0 = (h_0, s_0, b_0)$ of the first line segment in the HSB color space based on $b_1$, $b_2$, and the following third preset formula, wherein
the third preset formula comprises:

$$b_0 = \begin{cases} \dfrac{b_1 + b_2}{2} + T_2 & \text{when } \dfrac{b_1 + b_2}{2} + T_2 \leq 1 \\ \dfrac{b_1 + b_2}{2} + T_2 - 1.0 & \text{when } \dfrac{b_1 + b_2}{2} + T_2 > 1 \end{cases};$$

$T_2 \in [0, 1]$ and $T_2 \geq \dfrac{T_1}{2}$.

16. The terminal according to claim 11, wherein the processor is specifically configured to:
separately determine $V_{1r}$, $V_{1g}$, and $V_{1b}$ in the vector $V_1 = (V_{1r}, V_{1g}, V_{1b})$ of the RGB color space of the rectangular area $R_1$, and $V_{2r}$, $V_{2g}$, and $V_{2b}$ in the RGB vector $V_2 = (V_{2r}, V_{2g}, V_{2b})$ of the RGB color space of the rectangular area $R_2$ in the following manners S1 to S4:
S1: determining a histogram $H_{ki}$ of an i channel in an RGB color space of a rectangular area $R_k$, wherein k=1 or 2, and i=r, or g, or b;
S2: obtaining a grayscale $G_{ki}$ having a largest probability in the histogram $H_{ki}$;
S3: determining, by using $G_{ki}$ as a center with reference to the following fourth preset formula, a sum $S_{ki}$ of probabilities of all grayscales between two grayscales having a same distance to $G_{ki}$, until $S_{ki} > T_{ki}$, wherein $T_{ki}$ is a preset rational number having a value range of 0 to 1; and
S4: determining $V_{ki}$ in an RGB vector $V_k$ of the RGB color space of the rectangular area $R_k$ based on $S_{ki}$ and the following fifth preset formula; and
determine the vector $V_1 = (V_{1r}, V_{1g}, V_{1b})$ of the RGB color space of the rectangular area $R_1$ based on $V_{1r}$, $V_{1g}$, and $V_{1b}$, and determine the vector $V_2 = (V_{2r}, V_{2g}, V_{2b})$ of the RGB color space of the rectangular area $R_2$ based on $V_{2r}$, $V_{2g}$, and $V_{2b}$, wherein
the fourth preset formula comprises:

$$S_{ki} = \sum_{g_{k1}}^{g_{k2}} H_{ki}(x)$$

$x \in [g_{k1}, g_{k2}]$, wherein $G_{ki} - g_{k1} = g_{k2} - G_{ki}$;

and the fifth preset formula comprises:

$$V_{ki} = \sum_{g_{k1}}^{g_{k2}} x * H'_{ki}(x) \ x \in [g_{k1}, g_{k2}], \text{ where } H'_{ki}(x) = \dfrac{H_{ki}(x)}{S_{ki}},$$

wherein $H_{ki}(x)$ indicates a probability value of a grayscale having a grayscale of x in an i channel in a grayscale histogram of a $k^{th}$ area, $H'_{ki}(x)$ indicates normalization for $H_{ki}(x)$, and $\Sigma$ indicates obtaining a sum of all values in a range.

17. The terminal according to claim 11, wherein the processor is specifically configured to:
convert the vector $V_1$ to the vector $a_1 = (h_1, s_1, b_1)$ of the HSB color space, and convert the vector $V_2$ to the vector $a_2 = (h_2, s_2, b_2)$ of the HSB color space based on the following sixth preset formula, seventh preset formula, and eighth preset formula, wherein
the sixth preset formula comprises: $b_k = \max(V_{kr}, V_{kg}, V_{kb})$;
the seventh preset formula comprises:

$$s_k = \begin{cases} \dfrac{b_k - \min(V_{kr}, V_{kg}, V_{kb})}{b_k} & \text{when } b_k \neq 0 \\ 0 & \text{when } b_k = 0 \end{cases};$$

and the eighth preset formula comprises:

$$h_k = \begin{cases} 60(V_{kg} - V_{kb})/(b_k - \min(V_{kr}, V_{kg}, V_{kb})) & \text{when } b_k = V_{kr} \\ 120 + 60(V_{kb} - V_{kr})/(b_k - \min(V_{kr}, V_{kg}, V_{kb})) & \text{when } b_k = V_{kg} \\ 240 + 60(V_{kr} - V_{kg})/(b_k - \min(V_{kr}, V_{kg}, V_{kb})) & \text{when } b_k = V_{kb} \end{cases},$$

wherein k=1 or 2, max indicates obtaining a maximum value for all variables, and min indicates obtaining a minimum value for all the variables.

18. The terminal according to claim 11, wherein the processor is specifically configured to:
convert the vector $a_0$ to the vector $V_0 = (V_{0r}, V_{0g}, V_{0b})$ of the RGB color space based on the following ninth preset formula to fourteenth preset formula, wherein the ninth preset formula comprises:

$$h_m = \left\lfloor \frac{h_0}{60} \right\rfloor \bmod 6,$$

wherein $$\left\lfloor \frac{h_0}{60} \right\rfloor \bmod 6$$

indicates obtaining a remainder of division of a largest integer less than $$\frac{h_0}{60}$$

by 6;
the tenth preset formula comprises:

$$f = \frac{h_0}{60} - h_m;$$

the eleventh preset formula comprises: $p=b_0*(1-s_0)$;
the twelfth preset formula comprises: $q=b_0*(1-f*s_0)$;
the thirteenth preset formula comprises: $t=b_0*(1-(1-f)*s_0)$; and the fourteenth preset formula comprises:

$$(V_{0r}, V_{0g}, V_{0b}) = \begin{cases} (b_0, t, p), & h_m = 0 \\ (q, b_0, p), & h_m = 1 \\ (p, b_0, t), & h_m = 2 \\ (p, q, b_0), & h_m = 3 \\ (t, p, b_0), & h_m = 4 \\ (b_0, p, q), & h_m = 5 \end{cases}.$$

19. The terminal according to claim 11, wherein the display screen is specifically configured to:
display each edge line segment in the target quadrilateral based on the vector of each edge line segment in the target quadrilateral in the RGB color space.

20. The terminal according to claim 11, wherein the display screen is specifically configured to:
calculate, by using the processor based on a fifteenth preset formula and a value of an H channel in a vector of each edge line segment in the target quadrilateral in the HSB color space, a Δh value corresponding to each edge line segment in the target quadrilateral; and
display each edge line segment in the target quadrilateral based on a vector that is of an edge line segment corresponding to a smallest Δh value in the four Δh values corresponding to the four edge line segments in the target quadrilateral and that is in the RGB color space, wherein
the fifteenth preset formula comprises: $\Delta h = |h_1 - h_2|$.

* * * * *